United States Patent

Spies et al.

[11] Patent Number: 6,055,314
[45] Date of Patent: Apr. 25, 2000

[54] SYSTEM AND METHOD FOR SECURE PURCHASE AND DELIVERY OF VIDEO CONTENT PROGRAMS

[75] Inventors: Terence R. Spies, Kirkland; Daniel R. Simon, Redmond, both of Wash.

[73] Assignee: Microsoft Corporation, Redmond, Wash.

[21] Appl. No.: 08/620,603

[22] Filed: Mar. 22, 1996

[51] Int. Cl.[7] .............................. H04N 7/167; H04L 9/00; H04K 1/00
[52] U.S. Cl. .............................. 380/21; 380/10; 380/23; 380/3
[58] Field of Search .................................. 380/10, 16, 20, 380/21, 23, 25

[56] References Cited

U.S. PATENT DOCUMENTS

| 4,736,422 | 4/1988 | Mason | 380/10 |
|---|---|---|---|
| 4,908,834 | 3/1990 | Wiedemer et al. | 380/20 |
| 5,029,207 | 7/1991 | Gammie | 380/10 |
| 5,054,064 | 10/1991 | Walker et al. | 380/5 |
| 5,420,866 | 5/1995 | Wasilewski | 380/10 |
| 5,481,609 | 1/1996 | Cohen et al. | 380/21 |
| 5,539,828 | 7/1996 | Davis | 380/23 |
| 5,640,453 | 6/1997 | Schuchman et al. | 380/10 |
| 5,644,354 | 7/1997 | Thompson et al. | 380/20 |
| 5,666,412 | 9/1997 | Handelman et al. | 380/20 |
| 5,721,778 | 2/1998 | Kubota et al. | 380/10 |
| 5,721,781 | 2/1998 | Deo et al. | 380/25 |
| 5,742,756 | 4/1998 | Dillaway et al. | 380/25 |
| 5,745,571 | 4/1998 | Zuk | 380/21 |

Primary Examiner—Harshad Patel
Assistant Examiner—Robin Clark
Attorney, Agent, or Firm—Lee & Hayes, PLLC

[57] ABSTRACT

A system and method for secure purchase and delivery of video content programs over various distribution media, including distribution networks and digital video disks, includes an integrated circuit card (e.g., a smart card, PCM-CIA card) which is configured to store decryption capabilities for related video programs. The decryption capabilities are initially kept in a secure store at a video merchant. When a purchaser orders a particular video program, the decryption capabilities for that program are downloaded to the IC card, either at the merchant premises or over a distribution network. The video content program is distributed in encrypted format via the distribution media to the purchaser. The IC card uses the decryption capabilities to at least partly decrypt the video content program without exposing the decryption capabilities.

74 Claims, 11 Drawing Sheets

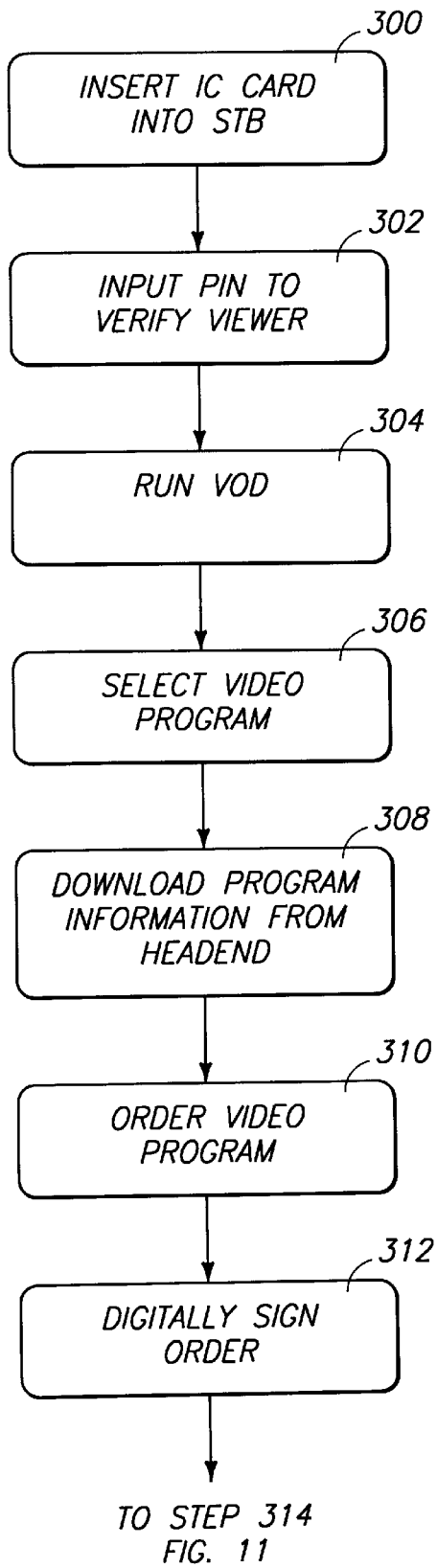

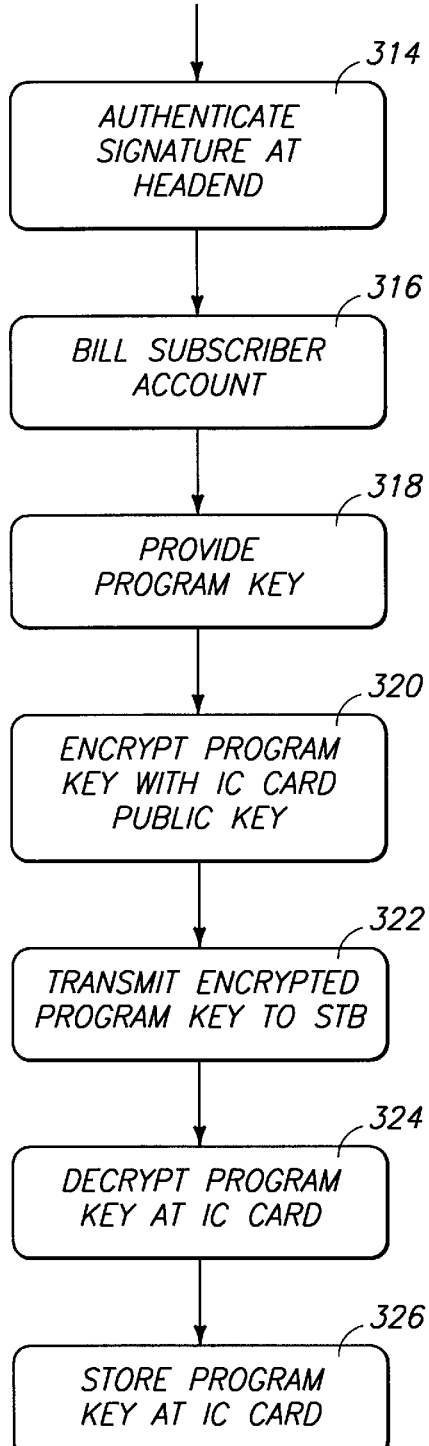

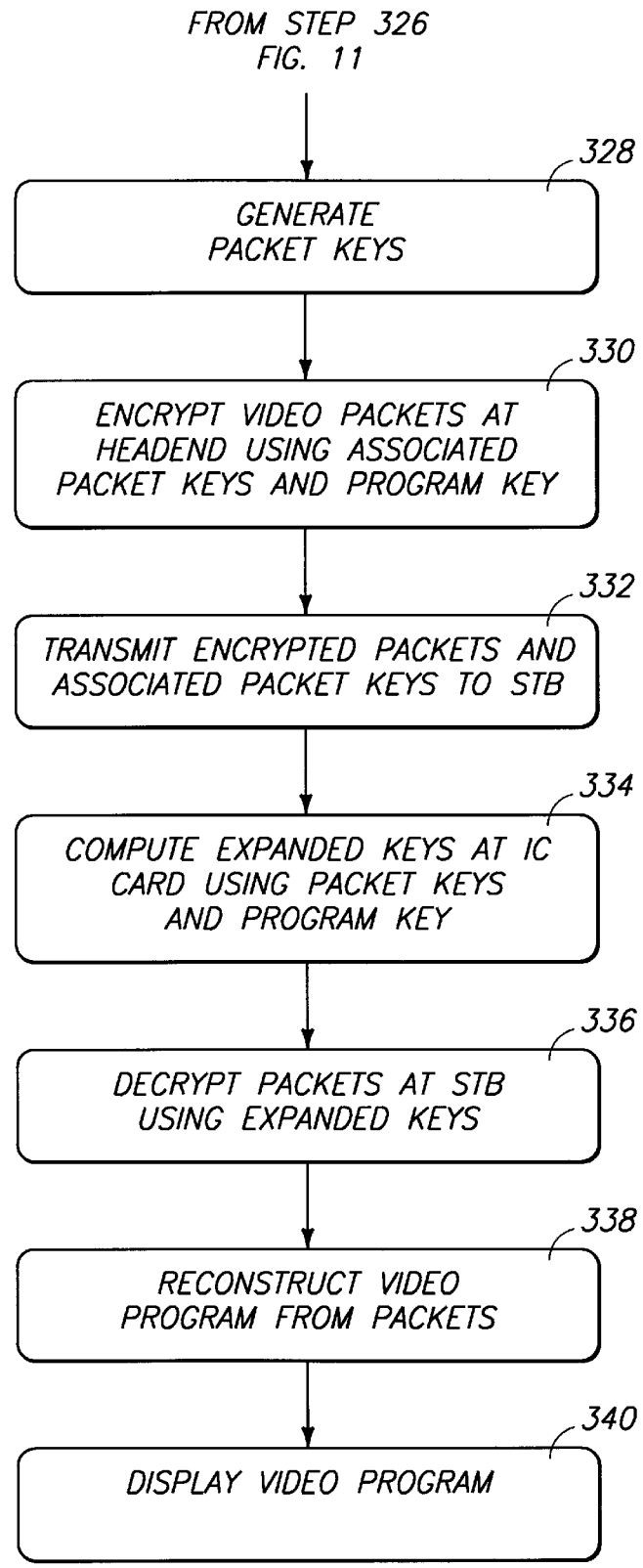

SYSTEM AND METHOD FOR SECURE PURCHASE AND DELIVERY OF VIDEO CONTENT PROGRAMS

TECHNICAL FIELD

This invention relates to systems and methods for secure purchase and delivery of video content programs over various distribution media, including distribution networks (such as telephone systems, computer networks, and interactive television networks) and digital video disks.

BACKGROUND OF THE INVENTION

Video content programs are commonly supplied to viewers in many different forms, including theater films, video cassettes, TV cable and broadcast systems, game CDs, and on-line networks. Most valuable video content programs (such as first-run or near-first-run feature length films) are distributed to consumers for home viewing on video cassettes, which are rented or purchased from local vendors, or over TV cable or satellite networks on a special premier channels (e.g., HBO®, ShowTime® or Pay-Per-View®). With recent technology improvements, video content programs can also be delivered on digital video disks (DVDs) which are the video equivalent to music CDs. Unlike conventional video cassettes which store the video in analog format, DVDs store the video in digital format which results in a higher quality reproduction.

The delivery of valuable video programs to consumers creates a risk of video piracy. Without protection, the video programs can be illicitly intercepted, copied, and redistributed for illegal gain.

One object of this invention is to provide a system and method for the secure delivery of video content programs to consumers for home viewing.

The design issues in developing a secure video delivery system are complicated in that the video content programs can be delivered via many different media. For instance, when the video is distributed over a television cable network to a viewer's set-top box (STB), the focus of security efforts are on preventing unauthorized interception of the video in route to the STB. Traditional design architectures assume that it will be difficult for the viewer to reproduce and distribute the video once it reaches the STB. On the other hand, when the video is distributed on cassette or DVD, the viewer is considered to have the ability to record and redistribute the video with little difficulty. The design effort in this area has therefore been directed to preventing the output data from being copied.

Another object of this invention is to provide a unified video delivery system and method that is versatile to support distribution over many different kinds of media, including networks and DVDs.

In the cable network setting, previous video delivery architectures rely on encryption of the video stream at a headend prior to transmission over the network and use of metering chips located at the STB to limit the number of decryptions performed on the video stream. These metering chips are part of a secret and trusted operating system at the STB. Other architectures employ chips at the STB that require online access to an authorization database prior to decrypting the video stream. However, each of these solutions are highly subject to attack because the STB can be tampered with and patiently reverse engineered until the secret protocols implemented into the operating system are discovered.

It is therefore another object of this invention to provide a secure video delivery system and method that has no global secrets built into any hardware, thereby eliminating the risk that cracking a specific hardware component such as the STB will compromise the entire system.

Despite the best devised plans, protection schemes will inevitably be attacked by pirates who will attempt to circumvent the protection schemes to obtain illegal access to previously distributed videos and new videos as they are released. To minimize the risk of successful attacks, it is desirable to develop protection schemes that are easily replaceable and controllable. In this manner, the video distributors can stay one step ahead of the pirates by replacing protection schemes when or before they are successfully attacked.

Another object of this invention is to provide a secure delivery system that permits easy replacement of the security protocol.

It is also an object of this invention to provide a secure video delivery system that is convenient for consumers to use. The system should grant selective access to paying consumers in a simple, secure manner.

SUMMARY OF THE INVENTION

This invention concerns a system and method for secure purchase and delivery of video content programs over various distribution media, including distribution networks and digital video disks. The video delivery system is architected on a concept of purchasing decryption capabilities for a particular video that the viewer wishes to see. These decryption capabilities are stored on an integrated circuit (IC) card, such as a smart card or PCMCIA card, that is issued to the viewer. The IC card is configured with cryptographic functionality to support the secure purchase of the decryption capabilities from the video merchant. The IC card can then operate in conjunction with a viewer's set-top box (STB), DVD player, or other video computing device to decrypt a video stream of the selected video content program using the purchased decryption capabilities stored on the IC card without exposing those capabilities to the viewer or video computing device.

The IC card is the only trusted component in the system and is easily replaceable. This allows video distributors to upgrade or modify security schemes before a pirate successfully attacks the existing scheme. No global secrets are built into any hardware, such as the STB. In this manner, the system cannot be successfully attacked by cracking a specific hardware component.

According to one aspect of this invention, a system for purchasing video content programs includes a merchant computing unit at a video merchant and a purchaser integrated circuit (IC) card which compatibly interfaces with the merchant computing unit. The purchaser selects a video content program and the merchant computing unit downloads decryption capabilities unique to the selected video content program to the purchaser IC card for use in decrypting the selected video content program. These decryption capabilities include a program key unique to a related video content program and a policy concerning decryption protocols.

In one case, the purchaser might physically carry the IC card to the video merchant for a point of sale purchase of a video content program. The purchaser browses the video selection and rents one or more video programs. At check out, the purchaser presents the IC card to the video merchant and pays for the program. The video merchant inserts the IC card into a compatible I/O device connected to the merchant computing unit to download the decryption capabilities for the selected video program. The decryption capabilities are then stored on the IC card.

In another case, the IC card might be inserted into the purchaser's computing unit resident at his/her own home which is interconnected to the video merchant computing unit via a distribution network, such as an interactive television (ITV) network, a computer network, or a telephone network. The viewer computing unit might be in the form of an STB, a desktop or portable computer, a DVD player, or some other computing mechanism that is capable of handling video content programs. The purchaser browses the selections via a user interface program, such as the video-on-demand mode in interactive television systems, and orders a video content program. The video merchant downloads the decryption capabilities over the distribution network to the purchaser IC card, where they are stored.

To enhance security, the IC card has a pair of public and private exchange keys and a pair of public and private signing keys. When the purchaser selects a video, the IC card digitally signs the order using the private signing key and passes a credential with the public exchange and signing keys to the video merchant computing unit. The video merchant computing unit authenticates the digital signature using the purchaser's public signing key. The video merchant computing unit then encrypts the decryption capabilities with the purchaser's public exchange key and digitally signs them. The encrypted decryption capabilities are transmitted to the IC card over an open and unprotected distribution network or other medium. The IC card authenticates the signature of the video merchant computing unit and decrypts the decryption capabilities using the private exchange key. The program key is extracted from the decryption capabilities and stored in the card's memory.

Following this purchase, another aspect of this invention concerns the secure delivery of the ordered video content program. The video content delivery system includes a video content provider (which may or may not be the same as the video merchant) and a viewer computing unit located at the viewer residence. A video encryption device at the video content provider supplies a video data stream in encrypted format on a distribution medium, such as a distribution network or a digital video disk. The video encryption device encrypts the video data stream using the cryptographic program key that is unique to the ordered video content program and included in the decryption capabilities. The IC card uses the stored program key to at least partly decrypt the video data stream provided from the distribution medium.

More particularly, the video encryption device configures the video data stream in individual packets of digital video data and encrypts each packet according to a function of a cryptographic packet key associated with each packet and the cryptographic program key. The packet key is sent to the viewer computing unit along with the encrypted video data packets. The purchaser IC card partly decrypts each packet according to the same function of the cryptographic program key and the associated cryptographic packet key without exposing the program key. The viewer computing unit completes the decryption process where the IC card leaves off.

In this manner, the video content program is delivered securely to the appropriate consumer. The decryption of the video program is based upon a packet key which is different for each packet and a program key which is stored and managed on the IC card without exposure to any other hardware component. There are no metering chips or other trusted components in the viewer computing unit itself. All long-term keys are asymmetric public/private key pairs which are easily revocable by the video content provider. This ensures that any successful attack at one specific system component can be contained.

According to other aspects of this invention, methods for the secure purchase and distribution of video content programs are described.

BRIEF DESCRIPTION OF THE DRAWINGS

FIG. 1 shows the computerized system in an initial transaction in which a video merchant is given authority to vend the video content programs. FIG. 2 shows the computerized system in a purchasing transaction in which a purchaser rents a video content program. FIG. 3 shows the computerized system in a distribution transaction in which the video content program is securely delivered to the purchaser.

FIGS. 10–12 are a flow diagram of a method for purchasing and delivering video content programs using the FIG. 9 implementation according to another aspect of this invention.

DETAILED DESCRIPTION OF THE PREFERRED EMBODIMENT

The following discussion assumes that the reader is familiar with cryptography. For a basic introduction to cryptography, the reader is directed to a text written by Bruce Schneier and entitled, "Applied Cryptography: Protocols, Algorithms, and Source Code in C," published by John Wiley & Sons, copyright 1994, which is hereby incorporated by reference.

Figure 1:
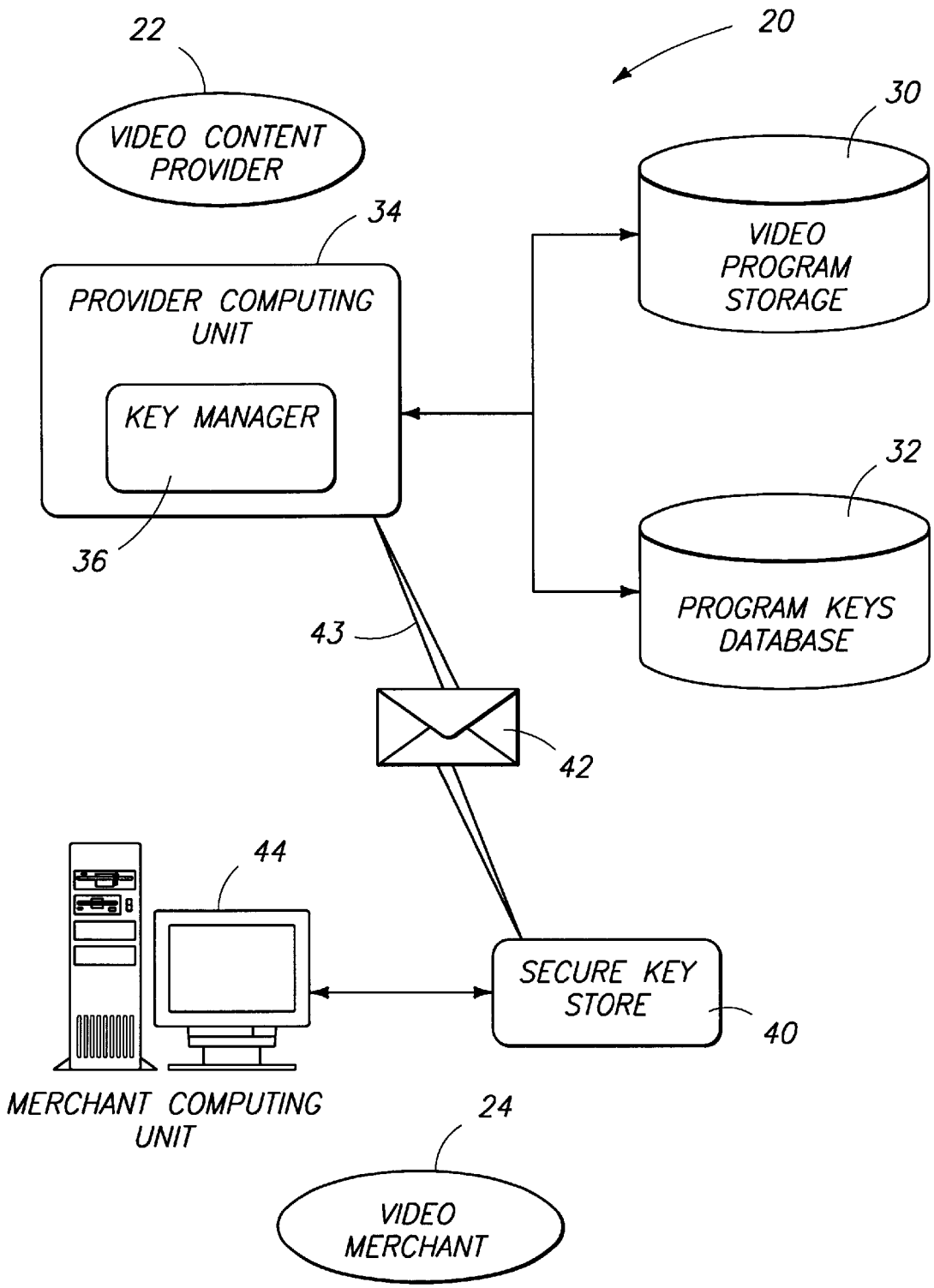
FIGS. 1–3 are diagrammatic illustrations of a computerized system which facilitates the secure purchase and delivery of video content programs.
Figure 2:
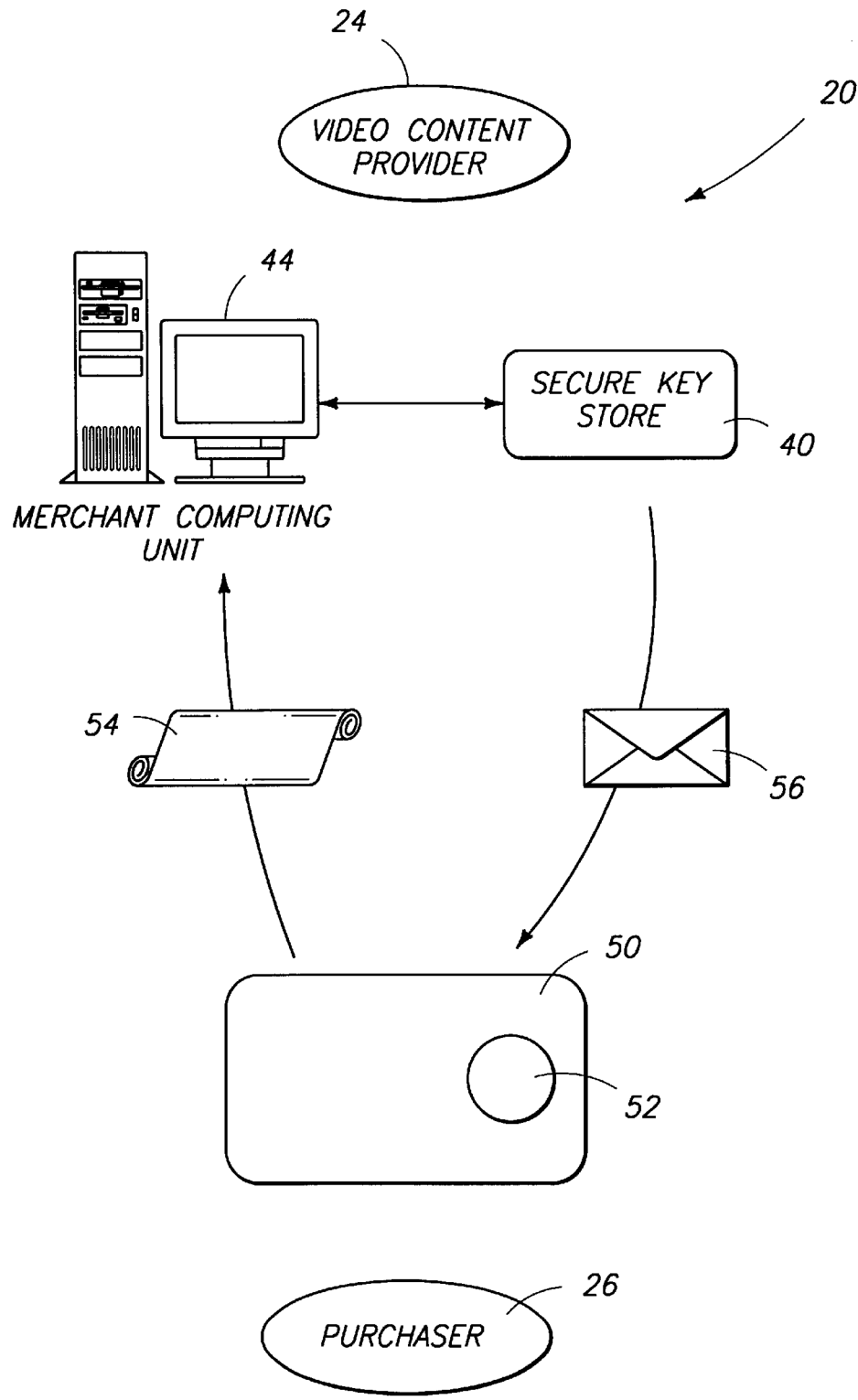
Figure 3:
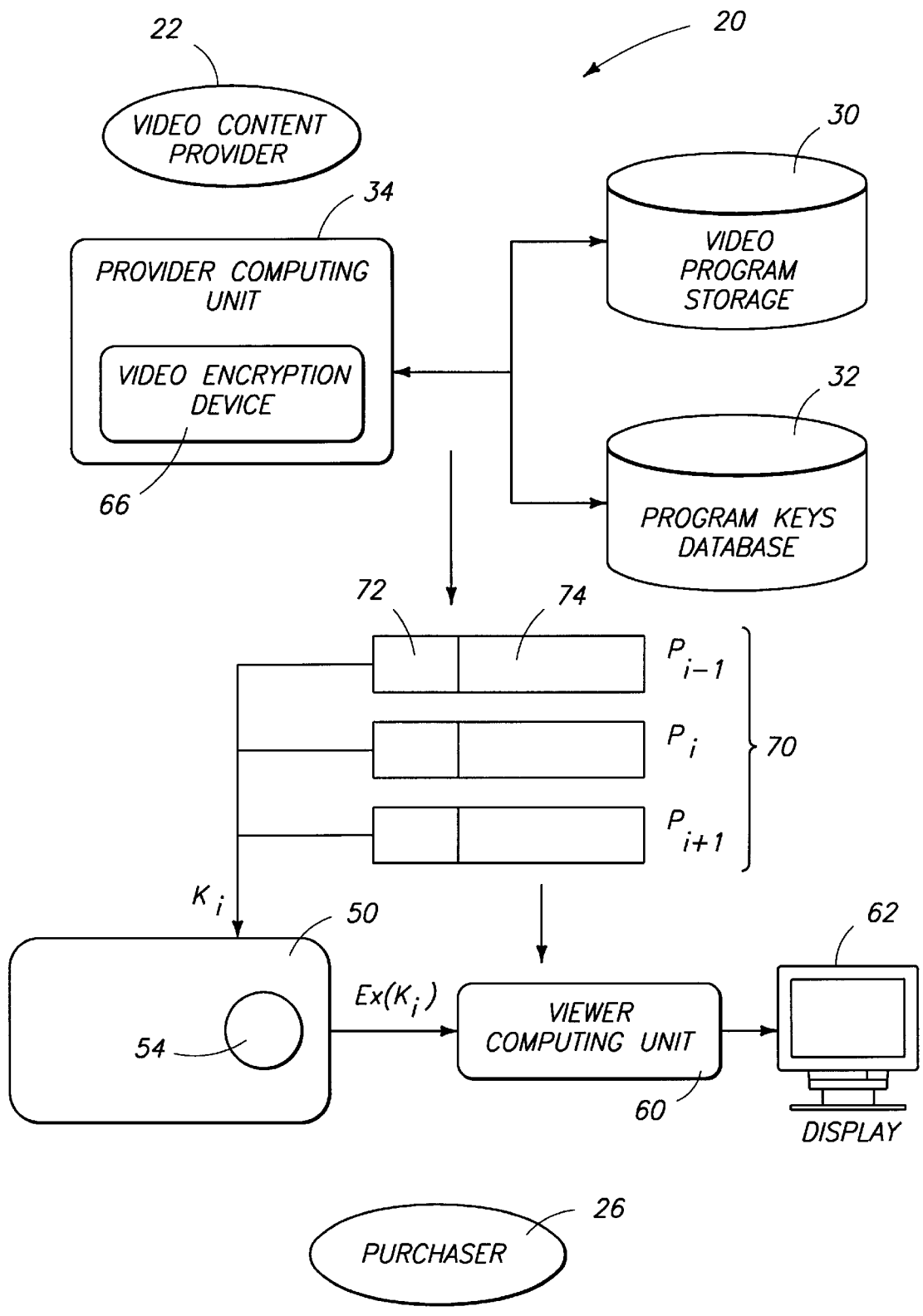

FIGS. 1–3 illustrate a computerized system 20 for the secure purchase and delivery of video content programs according to one aspect of this invention. The video purchase and delivery system 20 has several participants, including a video content provider 22, a video merchant 24, and multiple purchasers 26.

The video content provider 22 stores, manages, and supplies the video content programs to the purchasers. Video content programs might be in the form of television shows, cable shows, movies, video games, educational programs, and the like. Examples of a video content provider 22 include a cable operator, a television station, and a movie studio. The video merchant 24 markets and sells the video content programs to the purchasers. This participant might be a cable operator, a premier channel company, an online service provider, or a video rental retailer. In some cases, the video content provider and the video merchant are the same entity (e.g., a cable operator). The purchasers 26 are, of course, the viewing audience who browse, order, and watch selected video content programs.

Initial Provider/Merchant Transaction

FIG. 1 shows an initial transaction involving the video content provider 22 and the video merchant 24. In this transaction, the video content provider gives the video merchant the ability to sell a specific piece of video content. The video content provider 22 maintains a video program storage 30 which keeps the video content programs and a program keys database 32 which stores cryptographic program keys that correspond to associated video content programs. There is one program key for each video content program. The program keys database 32 is highly protected from physical attack by way of structural security facilities because the integrity of the database is important to the system. Disclosure of the program keys in plaintext would permit a pirate to become an unauthorized video content provider.

The video content provider 22 has a provider computing unit 34 to control video and key distribution. The provider computing unit 34 might be configured as a continuous media server that transmits video programs over a distribution network (e.g., ITV networks, computer networks, online networks) or a reproduction mechanism that transfers video content programs onto portable media for mass distribution (e.g., digital video disks). The provider computing unit 34 includes a key manager 36 which manages the secure distribution of the program keys without exposing them.

In the initial transaction, the provider computing unit 34 moves cryptographic program keys 42 for those programs that the video merchant 24 is authorized to sell into a secure key store 40 located at the merchant's facility or accessible by a video merchant computing unit 44. The program keys are encrypted by the key manager 36 at the video content provider, and conveyed to the secure key store 40 via a secure or insecure link 43, such as electronically over a network, or physically ported on a floppy diskette, or other means.

The secure key store 40 enables the video merchant 24 to vend encrypted versions of the program keys in a controlled way. However, the plaintext versions of the program keys are not exposed to the video merchant computing unit 44. The secure key store 40 maintains audit logs and may optionally limit the number of times the merchant sells the video program before the video content provider 22 is contacted for continued authorization.

Purchase Transaction

FIG. 2 shows the video purchase and delivery system 20 during a purchase transaction in which the purchaser 26 buys or rents a video content program from the video merchant 22. The purchaser 26 has an integrated circuit (IC) card 50 which can be compatibly interfaced to the merchant computing unit 44, either through direct connection or via a remote link. The IC card 50 is a portable card-like device that has processing capabilities. In the illustrated implementations, IC card 50 is a smart card. A "smart card" is the approximate size of a standard credit card and has a built-in microcontroller (MCU) 52 which enables the card to modify, or even create, data in response to external stimuli.

The microcontroller 52 is a single wafer integrated circuit (IC) which is mounted on an otherwise plastic card. A smart card is physically constructed in accordance with the international standard ISO-7816 which governs size and bendable limits of the plastic card, as well as size and location of the silicon integrated circuit. An example smart card implementation is described in more detail below with reference to FIG. 6. In other implementations, the IC card might be in the form factor of a PCMCIA card or a floppy diskette, with processing chip(s) configured thereon.

There are various avenues for purchasing a video content program. One familiar way is for the purchaser 26 to actually visit the video merchant 24. For instance, the video merchant might be a rental store where video content programs are physically arranged on shelves. Preferably, the video content programs are stored in encrypted format on a mass distribution media, such as digital video disks (DVDs). The purchaser browses the store selection and rents one or more video programs. In this case, the purchaser presents the IC card 50 to the video merchant for a point of sale purchase of a selected video content program. The video merchant inserts the IC card 50 into a compatible I/O device connected to the merchant computing unit 44 at the video merchant's premises. The IC card sends its credential 54 to the merchant computing unit 44 for authentication. If the IC card is verified, the merchant computing unit 44 transfers the cryptographic program key 56 for the selected video program from the secure key store 40 to the IC card 50. The purchaser 26 is given the DVD or other medium containing the video content program and returns home to play the video program. At home, the purchaser 26 inserts the IC card 50 into the disk player or other computing unit to decrypt the video content program.

Another way to purchase a video content program is through remote access. For example, the purchaser 26 might insert the IC card 50 into the purchaser's own computing unit (not shown in this figure) resident at his own home which is interconnected to the video merchant computing unit 44 via a distribution network, such as an interactive television (ITV) network, a computer network, or a telephone network. The viewer computing unit might be in the form of a set-top box (STB) connected to or integrated with a television, a desktop or portable computer, or some other computing mechanism that is capable of handling video content programs transmitted over the network. In this setting, the purchaser browses the selections interactively using a video purchasing application which executes on the purchaser computing unit. For instance, the video purchasing application might be in the form of a user interface program (e.g., a video-on-demand user interface) which enables the purchaser to sift through the various programs in an organized fashion. Once a program is selected, the purchaser computing unit generates an order for the video content program and sends the credential 54 along with the order over the network to the video merchant. The merchant computing unit 44 verifies the credential and downloads the cryptographic program key 56 over the distribution network to the purchaser IC card 50.

To promote security, the exchange of credentials and cryptographic program keys during the purchase transaction is shrouded in cryptographic protocol. Assume the purchaser orders a video content program from his/her computing unit. The computing unit generates an order describing the video content program and might additionally include instructions and authorization for payment. The microcontroller 52 of the IC card 50 is configured to execute various cryptographic functions, including hashing, signing, encryption, decryption, and authentication. The IC card 50 stores two asymmetric pairs of public and private cryptography keys: a signing pair and an exchange pair.

An "asymmetric" key algorithm involves two separate keys, one key to encrypt and one key to decrypt. The keys are based upon a mathematical relationship in which one key cannot be calculated (at least in any reasonable of time) from the other key. Encryption and decryption using an asymmetric key pair can be represented as follows:

$$E_{Kpri}(M)=M.enc$$

$$D_{Kpub}(M.enc)=M$$

where "$E_{Kpri}$" is an encryption function using a private key "Kpri," "M" is a plaintext message, "M.enc" is an encrypted version of the plaintext message, and "$D_{Kpub}$" is a decryption function using the public key "Kpub". The inverse is also true in that a plaintext message can be encrypted using the public key and then decrypted using the private key. In a public key system, the public key is distributed to other parties and the private key is maintained in confidence. The asymmetric public and private keys ensure two results. First, only the holder of the private key can decrypt a message that is encrypted with the corresponding public key. Second, if another party decrypts a message using the public key, that party can be assured that the message was encrypted by the private key and thus originated with someone (and presumably the holder) of the private key. An example asymmetric cipher is the well-known RSA cryptographic algorithm named for the creators Rivest, Shamir, and Adleman.

The IC card 50 computes a hash of the order through use of a hashing algorithm. A hash function is a mathematical function that converts an input data stream into a fixed-size, often smaller, output data stream that is representative of the input data stream. The IC card 50 then encrypts the hash using the private signing key of the signing pair to digitally sign the order, as follows:

$$E_{ksign.pur}(\text{Order Hash})=\text{Signature}$$

The signature is attached to the order. Next, the IC card 50 generates a random symmetric bulk data encryption key and encrypts the order and signature using the symmetric key. In a "symmetric" cipher, the encryption key can be calculated from the decryption key, and vice versa. In many cases, the encryption key and the decryption key are the same. The symmetric key must be known to both the sender and receiver, but otherwise kept secret. Once the symmetric key is divulged, any party can encrypt or decrypt messages. Example symmetric ciphers are a DES (Data Encryption Standard) encryption algorithm or an RC4 algorithm. The encryption of the order and signature is represented as follows:

$$E_{Ksym}(\text{order}+\text{signature})=\text{order.enc}$$

The IC card 50 then encrypts the symmetric key with a public exchange key of the video merchant (which is already known to the IC card), as follows:

$$E_{Kexckey.pub.merchant}(K_{sym})=K_{sym}.enc$$

The encrypted order and encrypted symmetric key are sent to the video merchant, along with a credential 54 of the IC card 50. The credential contains the public signing and exchange keys of the IC card, and can be signed by a trusted authority (i.e., a third party that is trusted by both the merchant and the purchaser).

The merchant computing unit 44 decrypts the symmetric key using its own private key of the key exchange pair of asymmetric keys, as follows:

$$D_{kexckey.pri.merchant}(K_{sym}.enc)=K_{sym}$$

The merchant computing unit 44 then decrypts the order and signature using the decrypted symmetric bulk data encryption key, as follows:

$$D_{Ksym}(\text{order.enc})=\text{order}+\text{signature}$$

This decryption yields the originator's signature which itself is the hash of the order that is encrypted with the signing private key of the originating participant. The merchant computing unit 44 verifies the purchaser's signature using the purchaser's signing public key which was provided in the purchaser's credential that was forwarded with the order. If the decryption yields a hash that compares, bit-for-bit, with an independently, locally computed hash of the order, the merchant computing unit 44 can be assured that the IC card 50 signed the order. Optionally, the merchant computing unit can further authenticate the purchaser by verifying the digital signature of a trusted authority on the credential.

After the IC card 50 has been verified, the video merchant 22 grants the purchaser 26 decryption capabilities to the ordered video content program. The decryption capabilities are unique to the IC card and the purchased program so that the capabilities cannot be transferred to other people or other video programs. To grant the decryption capabilities, the merchant computing unit 44 generates a request to the secure key store 40. This request contains the purchaser credential, a serial number of the ordered video content program, and a policy statement detailing the conditions of decryption (e.g., the number of decryption times, etc.). The secure key store 40 constructs the decryption capabilities which include the policy and the program key for the ordered video content program. The policy and program key are encrypted using the public exchange key of the IC card to form package 56, as follows:

$$E_{Kexc.pub.purchaser}(\text{policy}+\text{program key})=\text{Package 56}$$

The package 56 is transferred to the IC card 50 directly, or over a network. The IC card decrypts the policy and program key using its own private exchange key, as follows:

$$D_{kexc.pri.purchaser}(\text{Package 56})=\text{policy}+\text{program key}$$

The purchaser 26 now has the capabilities to decrypt the video content program that he/she purchased. The secure key store 40 or merchant computing unit 44 can optionally sign the package 56 according to the techniques described above concerning the purchaser's digital signature of the order. If signed, the IC card 50 can decrypt and verify the package as coming from the secure key store 40 and/or the merchant computing unit 44.

Delivery Transaction

FIG. 3 shows the video purchase and delivery system 20 during a delivery transaction in which the video content program is delivered in encrypted format to the purchaser 26 via a distribution medium. For purposes of explanation, the illustrated distribution medium is a distribution network over which the video content provider transmits the encrypted program to the purchaser's home computing unit 60. Alternatively, the video content program might be encrypted on a digital video disk that the purchaser takes home from the video merchant, like traditional video cassette rentals.

The purchaser 26 has a home viewer computing unit 60 which controls the video output to a display 62. For instance, the viewer computing unit 60 might be a set-top box for an interactive television system and the display 62 might be a television. An example in this context is described below in detail with reference to FIGS. 9–12. As another example, the viewer computing unit 60 might be a digital video disk player and the display 62 might be a television. As still another example, the viewer computing unit 60 might be a computer with the display 62 being a monitor.

The viewer computing unit 60 has a card I/O device which is compatible with the IC card 50. The viewer inserts the IC card 50 into the I/O device on the viewer computing unit 60. When the IC card 50 is coupled to the viewer computing unit 60, the microcontroller 52 on the IC card is interactively interfaced with the viewer computing unit 60 to cooperatively decrypt the video data stream received from the video content provider. The viewer computing unit 60 might optionally choose to offload some capabilities from the IC card 50 and store them locally to ease the decryption tasks since the viewer computing unit 60 employs a faster, more powerful processor and greater memory than the IC card. The viewer computing unit 60 is not permitted, however, to read the decryption capabilities because they remain encrypted using the cryptographic keys of the IC card. This ensures that no security is lost when the IC card 50 is interfaced with the viewer computing unit 60. Two possible implementations of the IC card 50 and viewer computing unit 60 are described below with reference to FIGS. 7 and 8.

The IC card 50 checks the policy provided in the decryption capabilities to insure that decryption is acceptable. The procedure might include, for example, evaluation of the current time and whether the rental period has elapsed, the serial number of the video program, or internal counters on the IC card. If the IC card concludes that decryption is possible, it prepares for decryption.

In the illustrated embodiment of FIG. 3, the video provider computing unit 34 has a video encryption device 66 which supplies a video data stream 70 of the purchaser video content program in encrypted format to the viewer computing unit 60. The provider computing unit 34 retrieves the video data stream from the video program storage 30 and configures it in individual packets of digital video data. Packets $P_{i-1}$, $P_i$, and $P_{i+1}$ are shown in data stream 70. The video encryption device 66 encrypts each packet according to a function of the cryptographic program key for the entire program and a cryptographic packet key that is uniquely generated for each packet itself.

Figure 4:
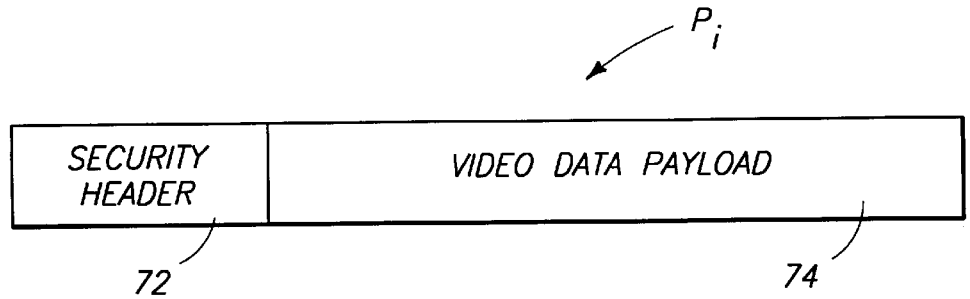
FIG. 4 is a diagrammatic illustration of a video data packet.

FIG. 4 shows packet $P_i$ in more detail. It contains a security header 72 and a video data payload 74. The security header 72 contains an encrypted version of the packet key for that packet. The security header 72 has an example size of 64–128 bytes. The payload 74 contains a segment of video data that has been encrypted using the packet key and program key. The video data payload 74 has an example size of 256 K bytes, which represents approximately one-eighth to one-fourth second of uncompressed video.

With reference again to FIG. 3, the video encryption device 66 generates a unique packet key $K_i$ for each packet. The packet key has an example size of 8–64 bytes. The video encryption device 66 expands the packet key $K_i$ according to a first cryptography function involving the packet key and the program key $K_{program}$ to form an expanded key $Ex(K_i)$, as follows:

First Cryptography Function=$f(K_i, K_{program})$=$Ex(K_i)$

The cryptography function is selected such that it is difficult (or computationally infeasible) to determine the packet key $K_i$ from the expanded key $Ex(K_i)$. One suitable cryptography function to expand the packet key is a repeated use of an algorithm known as "Safer K 64." The expanded key $Ex(K_i)$ has an example size of approximately 1 K–10 K bytes.

The video encryption device 66 then expands the expanded key $Ex(K_i)$ according to a second cryptographic function to produce a set of random bits, as follows:

Second Cryptography Function=$f(Ex(K_i))$=Random Bits

This cryptography function is likewise selected such that it is difficult (or computationally infeasible) to determine the expanded packet key $Ex(K_i)$ from the set of random bits. One appropriate cryptographic function to perform this secondary expansion is an algorithm known as "WAKE." The random set of bits has a size of 256 K bytes. The video encryption device 66 then encrypts the digital video data using the random set of bits to produce an encrypted data set. For instance, the 256 K bytes of digital video data and 256 K bytes of random bits are combined according to logic or arithmetic function, such as an "exclusive or" function, as follows:

Random Bits⊕Video Data=Encrypted Video Data Set

It is this encrypted data set that makes up the payload 74 of each packet $P_i$. The payload 74 is concatenated with the header 72, which contains the packet key $K_i$.

The packets $P_{i-1}$, $P_i$, and $P_{i+1}$ are provided on the distribution medium to the viewer computing unit 60. If the packets are routed over a distribution network, a routing header may also be added to guide the packets to the viewer computing unit.

Figure 5:
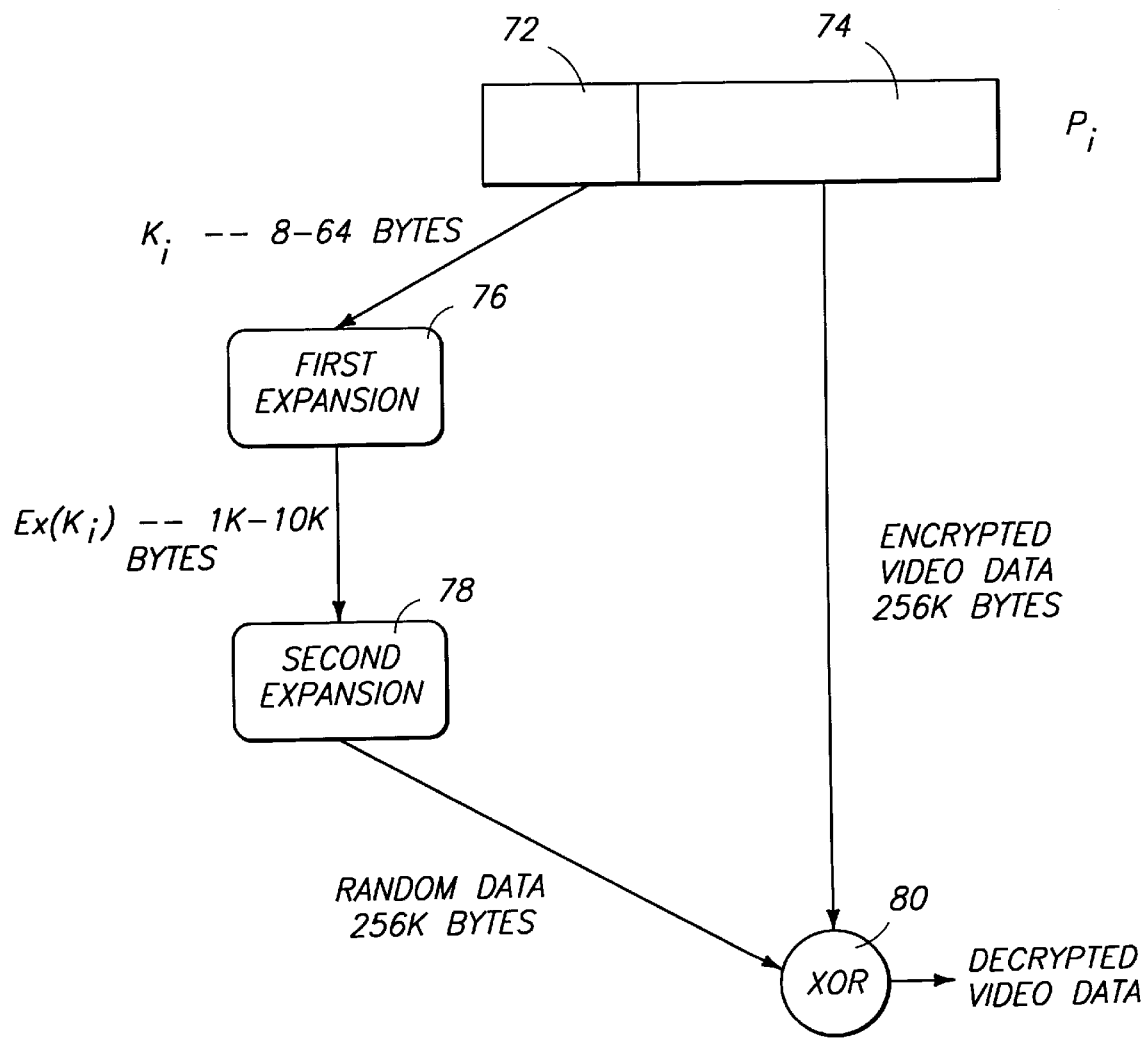
FIG. 5 is a diagrammatic illustration of a two phase decryption process employed in one implementation of this invention.

The decryption procedure for a packet $P_i$ is described with continued reference to FIG. 3, and additional reference to FIG. 5. At the viewer computing unit 60, the security header 72 of each packet is stripped off and input to the microcontroller 52 of IC card 50. The packet key $K_i$ and the program key $K_{program}$ (which is already stored in the card memory) are employed in the first cryptographic expansion function 76 to expand the packet key $K_i$ to produce the expansion key $Ex(K_i)$ (FIG. 5). The IC card 50 outputs the expanded key $Ex(K_i)$, not the packet key $K_i$, to the viewer computing unit 60. The IC card 50 then destroys the packet key $K_i$. In this manner, the individual packet keys are never made available to the viewer computing unit 60; rather, they are seen only by the IC card 50.

The viewer computing unit 60 takes the expanded key $Ex(K_i)$ for each packet and reproduces the random set of bits using the expanded key $Ex(K_i)$ according to the second expansion function 78 (FIG. 5). The random set of bits are then combined with the encrypted data set in payload 74 according to the "exclusive or" function 80 to produce the video data stream. The decrypted video data is then passed to the display 62 for viewing.

The dual expansion functions effectively define a symmetric cryptographic tool that is used for both encryption and decryption. The actual underlying program and packet keys used to create the symmetric cryptographic tool are not exposed together in raw form, but are kept confidential at the video provider and the IC card. The viewer computing unit is not even privy to the keys, rather it only receives the cryptographic tool output from the IC card. In this manner, the cryptographic protocol protects the security of the keys, without disrupting the delivery of video content programming.

The dual expansion cryptographic function further facilitates cooperation of the partial decryption performed by IC card 50 and the partial decryption performed by viewer computing unit 60. Under present technology, the IC card 50 i has a much slower, and less powerful processor (e.g., 8-bit processor) which is incapable of decrypting the entire video data stream in real-time. For instance, a typical smart card processor might operate at 10–30 Kbps (kilobits per second) whereas the video data stream is played at 6–8 Mbps (megabits per second). However, the IC card 50 is able to timely perform a partial decryption by expanding the packet key to the expanded key. The viewer computing unit can then use the expanded key to finish the decryption process, without ever having access to the decryption capabilities stored on the IC card. As IC card technology improves, the card processor might one day be able to fully decrypt the video data stream in real-time. This would be desired as the entire decryption process would be more securely performed on the IC card.

It is further noted that because the decryption is dependent upon the packet key, the decryption information changes every packet, or approximately every 300 ms. This continual alteration of the decryption information enhances security during transmission to minimize risk of the stream being intelligently intercepted and deciphered.

Figure 6:
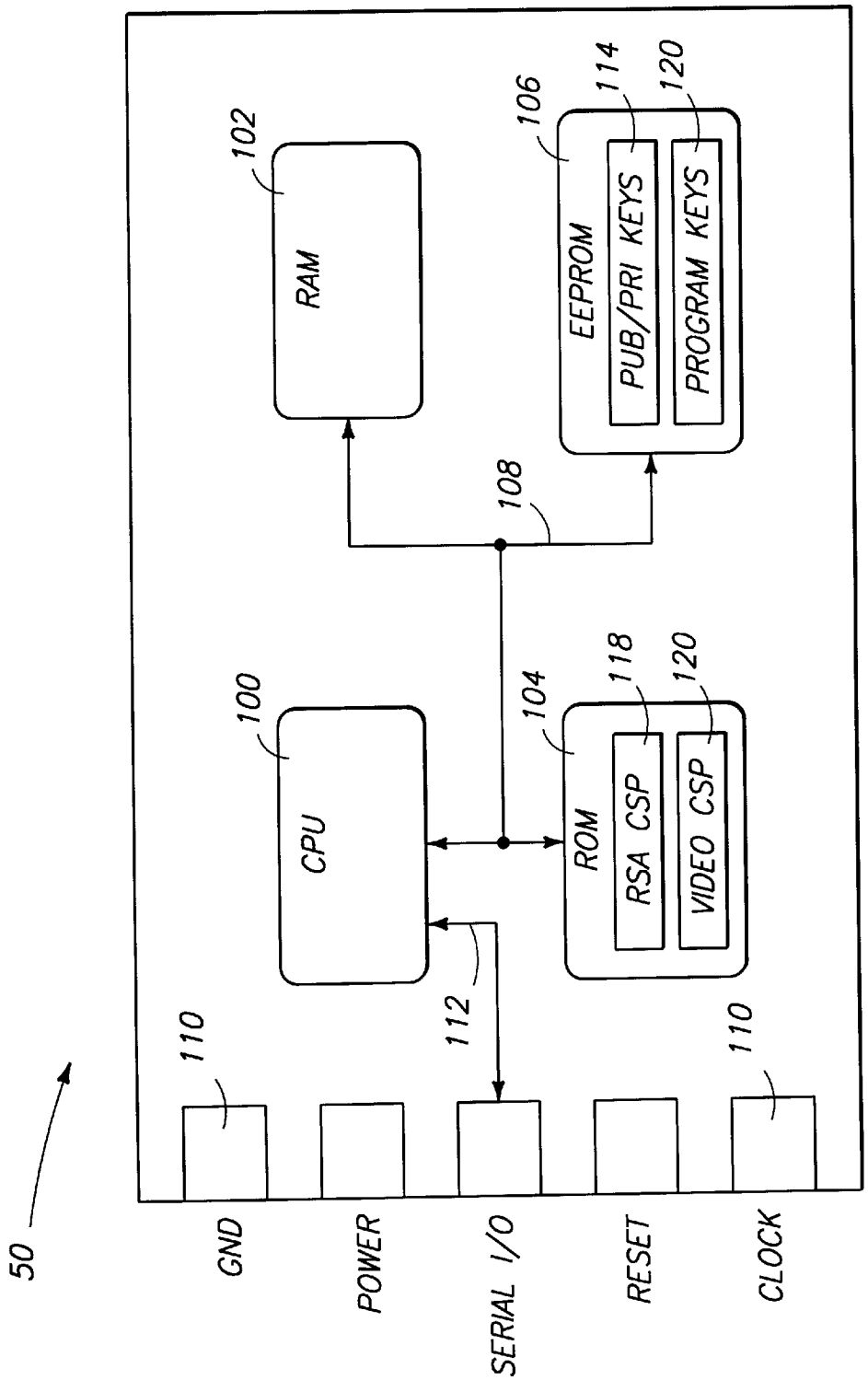
FIG. 6 is a block diagram of an IC card implemented as a smart card according to an aspect of this invention.

FIG. 6 shows IC card 50 implemented as a smart card. IC card 50 has a CPU 100, a volatile rewritable RAM (Random Access Memory) 102, a ROM (Read Only Memory) 104, and an EEPROM (Electrically Erasable Programmable ROM) 106. These components are coupled via a multi-bit bus 108. IC 50 also includes a set of couplings 110 in the form of conductive metal contacts which function as electrical data I/O couplings to external read/write equipment. Clock, reset, power, data I/O, and ground are example IC contacts 110 on a smart card. The serial I/O port is coupled to the CPU 100 via a serial conductor 112. One suitable microcontroller-based single-wafer IC that can be used in smart cards is available from Motorola Corporation under model number MC68HC05SC21.

The IC card 50 stores the two asymmetric pairs of public and private cryptography keys 114—the signing pair and the exchange pair—that are unique to the IC card in the EEPROM 106. The purchased program key 116 is also stored in the EEPROM 106. It is noted that other forms of non-volatile memory can be substituted for the EEPROM 106.

The IC card is configured with various cryptographic functionality to facilitate the purchase transaction and to at least partly decrypt the video data stream by producing the expanded key used in the decryption process. The cryptographic functionality is preferably implemented as one or more cryptographic service providers (CSPs) which perform encryption key management, encryption/decryption services, hashing routines, digital signing, and authentication tasks. In the illustrated implementation, an RSA CSP 118 is shown to represent the process involving use of asymmetric encryption algorithms, such as RSA algorithms. A video CSP 120 is shown to represent the video decryption process of expanding the packet key to the expanded key. With each of these representations, a different CSP might actually be configured to perform specific functions, such as encryption, decryption, signing, etc., although a single CSP can be implemented to perform them all.

The CSPs 118 and 120 are preferably implemented in software as dynamic linked libraries (DLLs) which are stored in ROM 104. This implementation is advantageous because it is easily invoked and dynamically accessible by an application running on the CPU 100. Furthermore, the cryptographic functions can be changed or updated simply by replacing one or more DLLs. Additionally, by packaging the cryptographic services in DLLs, it will be possible to change the strengths of the services as regulatory considerations change without impacting the higher level applications.

The CSP provides a key manager function that stores, generates, or destroys encryption keys of any type, including symmetric cryptographic keys and asymmetric cryptographic keys. The CSP is specifically designed to avoid exposing the purchaser's private keys to any application or user. The encryption keys are never directly accessible and the asymmetric private signing and exchange keys are not permitted to leave the CSP under any circumstances. In addition, the symmetric keys are permitted to leave the CSP only in an encrypted state; they are not exported in a raw form. In this manner, the CSP key manager prevents a foreign application from ever inadvertently mishandling keys in a way that might cause them to be intercepted by those to whom they were not directly sent.

The CSP provides a symmetric key generator function which generates the random symmetric bulk data encryption keys used to encrypt the orders sent to video merchant. These symmetric keys are "sessional" in that they are generated for each transaction. Once the symmetric keys are used and the transaction is completed, however, the CSP destroys them. The CSP further provides encryption/decryption services (for both symmetric and asymmetric keys), authentication/verification services, hash computational services, and digital signing. CSPs are explained in greater detail in a co-pending U.S. patent application, Ser. No. 08/496,801, filed Jun. 29, 1995, entitled "Cryptography System and Method for Providing Cryptographic Services for a Computer Application." This application was filed under the names of Terrence R. Spies, Jeffrey F. Spelman, and Daniel R. Simon and is assigned to Microsoft Corporation. The application is incorporated herein by reference.

Figure 7:
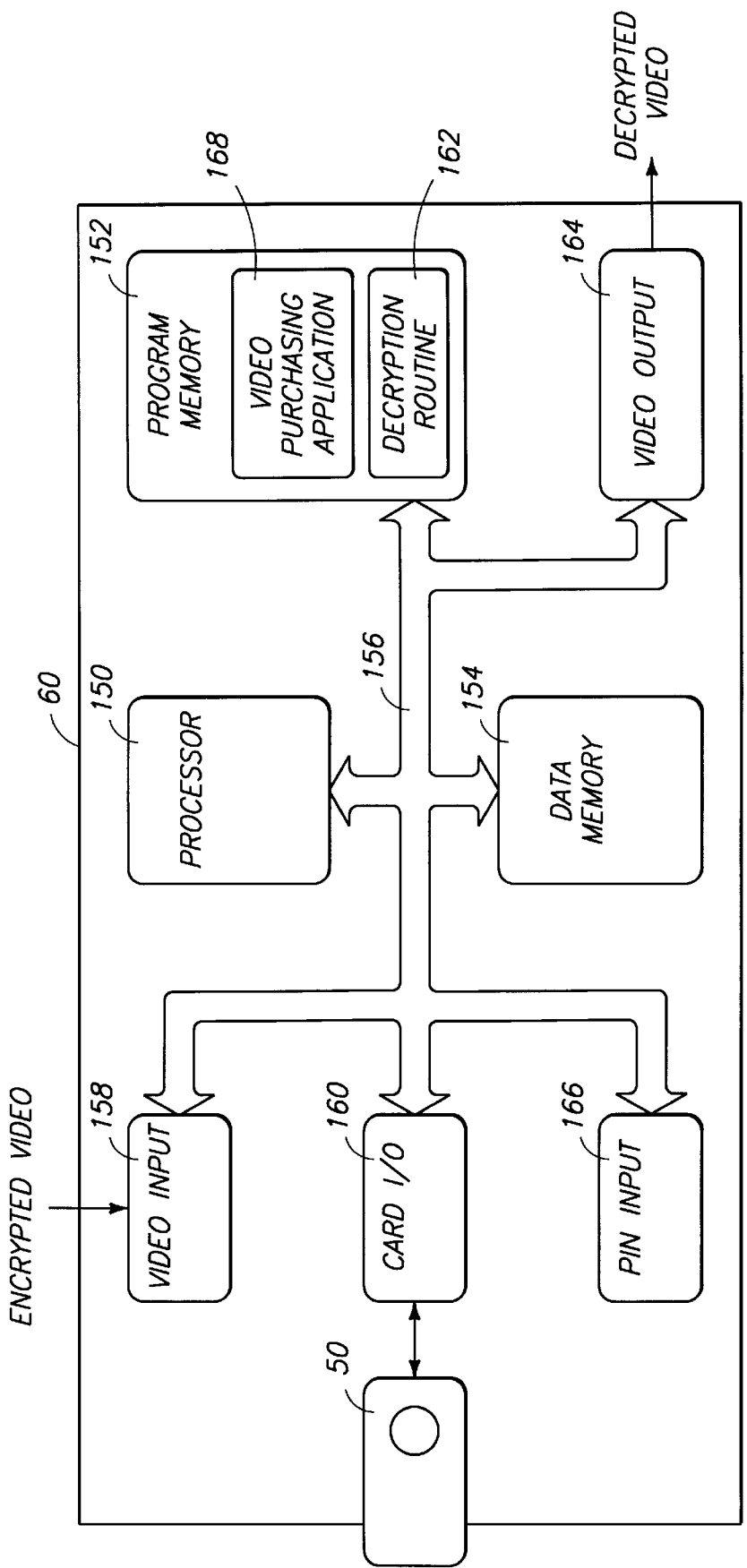
FIG. 7 is a block diagram of a viewer computing unit employed in the computerized system. The FIG. 7 computing unit is constructed according to a first implementation.

FIG. 7 shows the viewer computing unit 60 and its interface with the IC card 50 according to one implementation. When the IC card 50 is coupled to the viewer computing unit 60, the two apparatuses cooperate to form a video decryption device which decrypts the video data stream received from the distribution medium. The viewer computing unit has a processor 150, a program memory 152, and a data memory 154 connected to an internal multi-bit bus 156. The viewer computing unit 60 further comprises a video input 158 which receives the video data stream from the distribution medium. The video input can be implemented as a network port connected to receive the video data stream from a distribution network, or an optical reader for reading the video data stream from a DVD. For an interactive network, the video input 158 would be implemented as a network I/O port which manages both input and output communication.

A card I/O 160 is provided to interface with the IC card 50. In the illustrated embodiment, IC card 50 is a smart card which utilizes serial transmission. The card I/O 160 facilitates the serial transmission to, and reception from, the IC card 50.

The video input 158 receives the digital video data in its encrypted form. The video input can be configured to remove the packet key from the security header and pass it through the card I/O 160 to IC card 50. The remaining portion of the packet, including the encrypted video data payload, is passed onto the processor 150. The IC card 50 executes a video CSP 120 to expand the packet key $K_i$ to the expanded key Ex(K$_t$) using the program key 118 stored in its EEPROM 106. The expanded key Ex(K$_t$) is output from the IC card 50 and transferred to the processor 150. A decryption routine 162 stored in program memory 152 is executed on the processor 150 to produce the random set of bits from the expanded key Ex(K$_t$), and to combine the random set of bits with the encrypted data payload to reproduce the original digital video data. The viewer computing unit 60 has a video output 164 which outputs the decrypted video data to the display 62.

The viewer computing unit 60 can also be constructed to include a PIN input mechanism 166 to enable the viewer to input a PIN (personal identification number) for the IC card 50 to verify the authenticity of the viewer. The IC card 50 compares the input PIN with a number stored in its memory to determine whether the viewer is the authorized holder of the card. The viewer authentication can be provided as an initializing step to the purchaser transaction and delivery transaction which are described above. The PIN input mechanism 166 can be in the form of a keypad on the computing unit, or a remote control device and user interface (i.e., in the set-top box configuration) which permits remote entry of the PIN.

A video purchasing application 168 can also be stored in program memory 152 and executed on the processor 150. The video purchasing application allows the purchaser to browse from his/her own home those video content programs that are available from the video merchant and to order one. In the ITV implementation, this video purchasing application 168 might be a video-on-demand user interface. After a program is selected, the video purchasing application 168 generates the order, seeks approval from the viewer/purchaser, and has the order digitally signed by the RSA CSP executing on the IC card 50.

Figure 8:
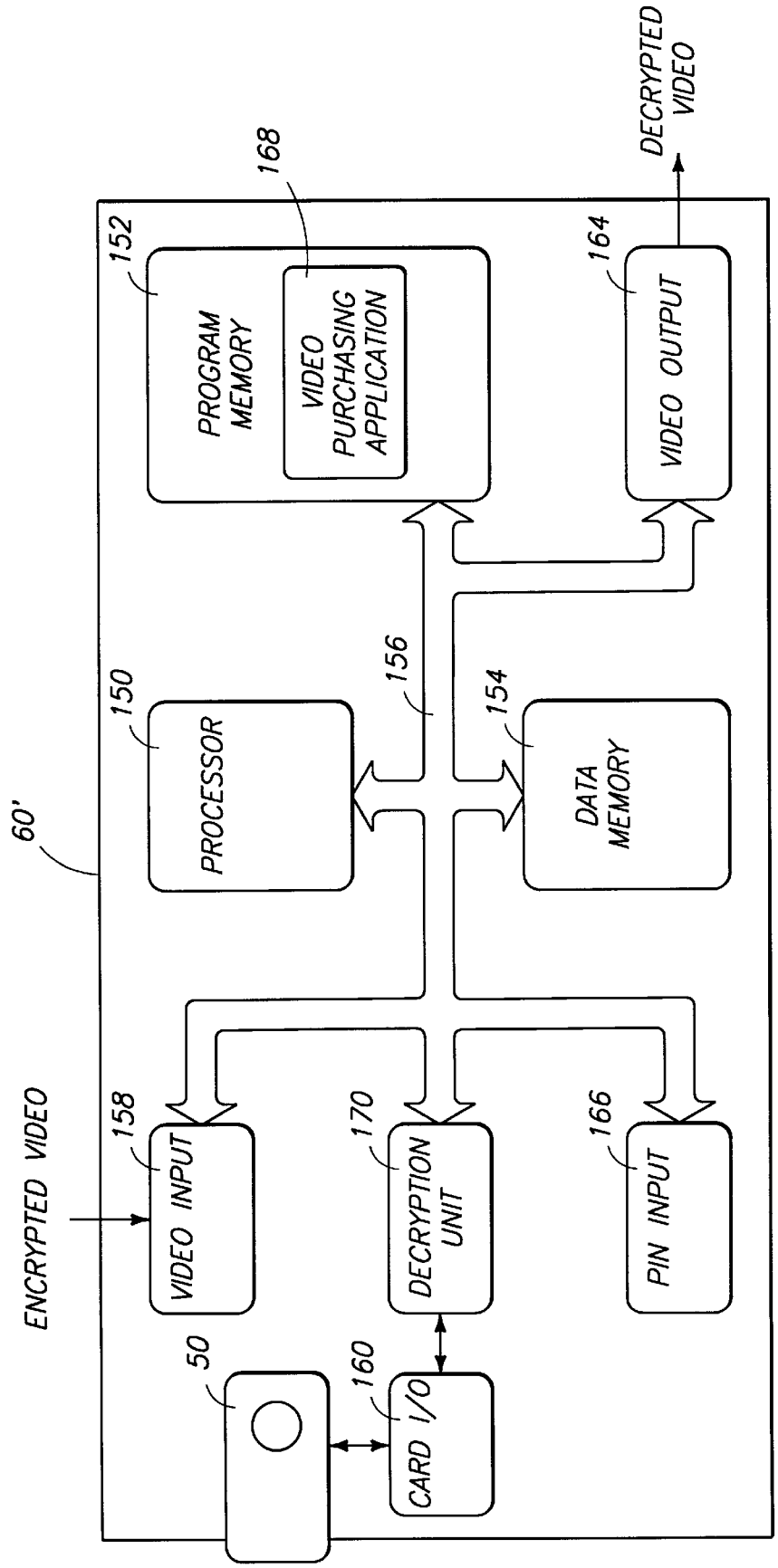
FIG. 8 is a block diagram of a computing unit constructed according to a second implementation.

FIG. 8 shows a modified viewer computing unit 60' that is used in the interactive network implementation. The modified viewer computing unit 60' includes a decryption unit 170 coupled to card I/O 160. The decryption unit 170 stores an identification number of the viewer computing unit which can be sent to the video provider (i.e., a cable operator) for verification that the computing unit is authorized. In this implementation, the viewer computing unit 60' is a semitrusted component in the video purchase and delivery system; whereas in the FIG. 7 implementation, the viewer computing unit is not trusted at all.

When the decryption unit 170 is employed, the secondary cryptography expansion is a function of the expanded key Ex(K$_t$) and the key of the decryption unit (which the video provider knows from an earlier credential swap). This adds a layer of security in that a pirate must successfully attack both the IC card and the decryption unit to get to the keying material.

Interactive Entertainment Network System

Figure 9:
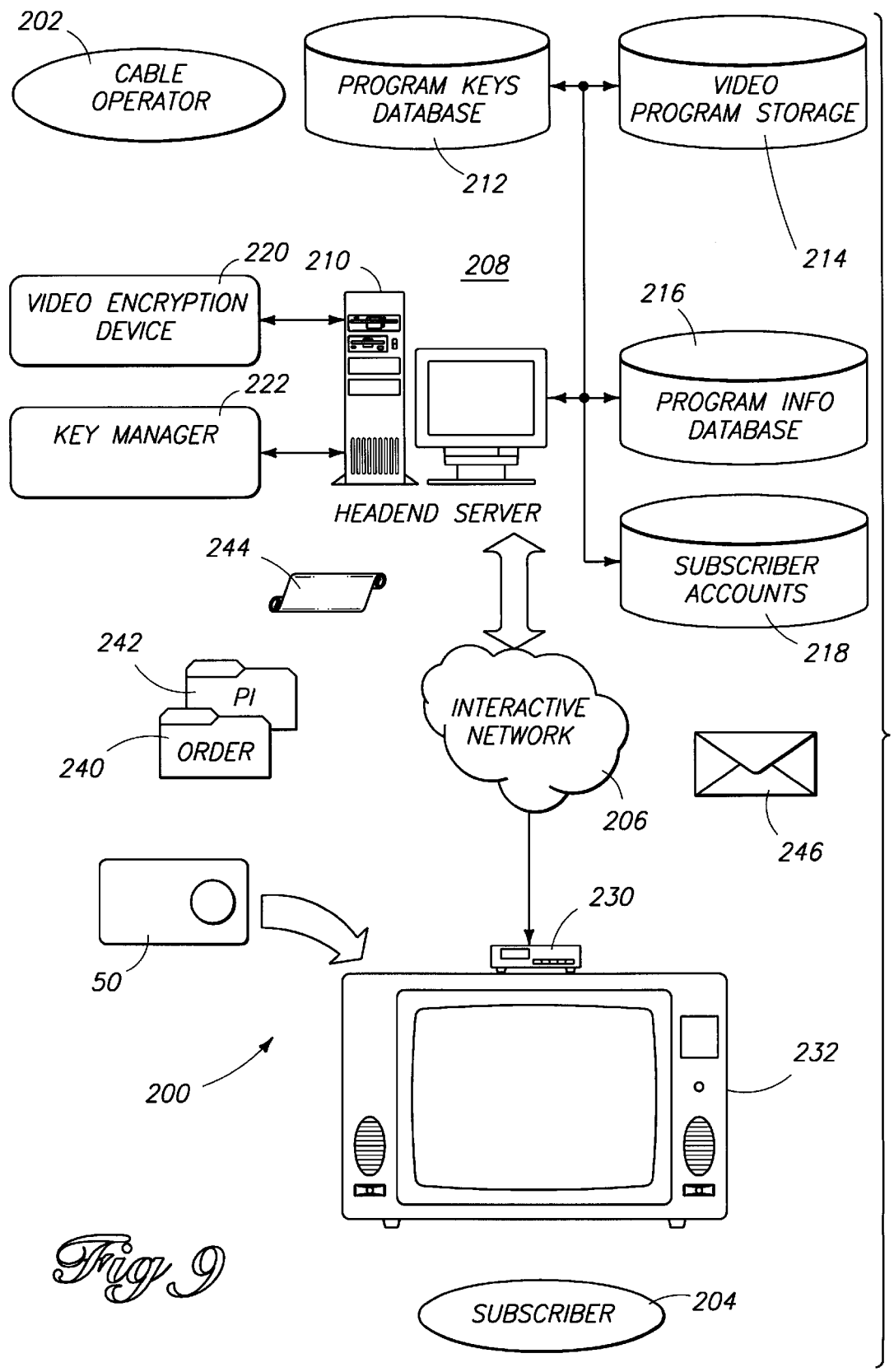
FIG. 9 is a diagrammatic illustration of a computerized video purchase and delivery system implemented as an interactive entertainment network system.

FIG. 9 shows the secure video purchase and delivery system implemented in an interactive entertainment network system 200 according to an aspect of this invention. Interactive entertainment network system 200 has a cable operator 202 interconnected to multiple subscribers 204 via an interactive network 206. Only one subscriber 204 is shown for purposes of discussion. In this implementation of the video purchase and delivery system, the cable operator 202 serves dual roles of video merchant and video content provider. The cable operator 202 performs its traditional tasks of providing video content programs to the subscribers and facilitating communication over an interactive network 206. The cable operator 202 might also support a video-on-demand (VOD) application which provides a virtual video store in the subscriber's own home. The VOD application allows the subscribers to interactively peruse and select video content programs from the virtual video store. Additionally, the cable operator 202 might perform the billing and collection tasks resulting from subscriber rentals of video content programs.

The cable operator 202 has a central, control headend 208 of the interactive entertainment network system 200. The headend 208 has a server 210 (or more likely, several servers) which offers the processing support to operate the interactive system. The headend 208 also has a program keys database 212, a video program storage 214, a program information database 216, and a subscriber account database 218. Among other things, the headend server 210 is configured to execute a video decryption application 220 and a key manager application 222, which is stored in program memory (not shown) at the headend.

The subscriber 204 is equipped with a user interface unit in the form of a set-top box (STB) 230 and a television 232. Instead of separate STBs, however, a user interface unit can be incorporated into the TV 232 itself. In addition to televisions, the user interface unit might be implemented as a computer with a monitor as its visual display unit.

Current and proposed technology allows video image and other data transmission over different types of cable and satellite systems, employing both analog and digital transmission formats. Current and proposed technology further permits image transmission from a server over conventional data networks, such as the Internet, to computers or network terminals which display the images. The terms "user interface unit" and "visual display unit" are not to be limited to any form or type of receiver, nor to any type of distribution network or transmission format. A user interface unit might be implemented in visual display units including broadcast televisions, cable-ready televisions, television/set-top box units, computers, and the like. For purposes of describing the FIG. 9 implementation, however, the user interface unit will be described in the context of a familiar television set-top box unit.

The subscriber STB 230 is interconnected with the headend 208 via an interactive network structure represented by the network cloud 206. One example implementation of the network structure is a hybrid fiber-optic/cable distribution system employing digital switching technologies such as asynchronous transfer mode (ATM) for bi-directional communications between the headend and individual subscribers. This multi-tier distribution system includes a high-speed, high-bandwidth fiber optic cable coupled between the headend and many regional distribution nodes. Each distribution node is then connected to multiple set-top boxes within the region via conventional home entry lines, such as twisted-pair telephone lines or coaxial cable. As an example, a single headend might service 250,000 or more subscribers, and each regional distribution node might support approximately 1200 subscribers. As technology continues to improve, parts of the network structure can be replaced with wireless forms of communication, such as RF communication or satellite communication.

Each subscriber is issued a video IC card 50 which is configured with various cryptographic service providers (CSPs) and has its own set of private and public key pairs. The STB 230 has a compatible card slot into which the IC card can be inserted.

The operation of the video purchase and delivery system will now be described with continuing reference to FIG. 9 and additional reference to the flow diagram of FIGS. 10–12.

At step 300 in FIG. 10, the subscriber inserts the IC card 50 into the STB 230. The IC card 50 and STB 230 perform a series of initialization routines to establish communication between the processors on the IC card and STB. At this point, the IC card might already have decryption capabilities loaded thereon for decrypting a particular video program. For this example, however, this is not the case as the decryption capabilities are downloaded from the headend.

The subscriber uses a keypad on the STB 230 or a TV remote control device to input the subscriber PIN (step 302). The STB 230 forwards the PIN to the IC card 50 for validation. The IC card compares the PIN input by the subscriber with the true subscriber number store in the card memory. If the two match, the subscriber is permitted to continue the video purchase procedures.

Each STB 230 is configured to run a video-on-demand (VOD) application (step 304). As noted above, VOD is like having a virtual video store in the subscriber's home. The VOD application presents a user interface which permits the subscriber to browse a wide selection of programs (movies, video games, TV shows, educational features, etc.) and rent the program they want to see immediately from their own TV sets. The VOD application can be resident at the STB or downloaded from the headend server when requested. The VOD application is invoked when the subscriber tunes to a dedicated VOD channel.

After tuning to the VOD channel and initiating the VOD application, the STB is initialized with starter lists of video selections or search categories which facilitate browsing. The subscriber might select one or more programs of interest for more information (step 306). Upon selection, the STB 230 sends a request for information on the selected programs. The headend server 208 retrieves the information from program information database 216 and transmits the information over the network 206 to the requesting STB 230 (step 308). The program information might include title, cast, director, rating, brief description, whether it is available in closed caption or another language, price, and so on. The subscriber can review the information, request additional information on the programs or information on different programs, order a program, or exit the VOD application.

Assuming the subscriber is ready to order a program, the VOD application presents a rental screen that displays the selected program, its price, tax, and other purchasing information. The subscriber is given the opportunity to confirm or deny the purchase request. Upon confirmation, the STB 230 generates an order for the video content program and accompanying payment instructions which define how the subscriber desires to pay for the program rental (step 310 in FIG. 10). The IC card 50 digitally signs the order and payment instructions using its private signing key (step 312). The signed order and payment instructions are encrypted with sessional symmetric keys that are then encrypted with the public exchange keys of the headend server 210. The STB 230 transmits the order 240, payment instructions 242, and subscriber credentials 244 (which includes credentials for both the IC card 50 and STB 230) over the network 206 to the headend server 210.

The headend server 210 decrypts the purchase order 240 and payment instructions 242 using its private exchange key. The headend server 210 verifies the digital signature using the public signing key of the IC card contained in credentials 244 (step 314 in FIG. 11). The headend server debits the subscriber billing account maintained in subscriber accounts 218 according to the payment instructions 242 (step 316). It is noted that the billing and collection tasks can be handled by a separate entity other than the cable operator, such as a financial institution. In this case, the STB or IC card might encrypt the symmetric keys used to encrypt the order and payment instructions with the public exchange keys of the intended recipient so that the cable operator can open only the order, and the financial institution can open only the payment instruction. Once the financial institution decrypts and verifies the payment instruction, it debits the subscribers account and returns a signed authorization receipt to the cable operator. Electronic commerce systems of this type are explained in greater detail in a co-pending U.S. patent application, Ser. No. 08/496,830, filed Jun. 29, 1995, entitled "System and Method for Secure Electronic Commerce Transactions." This application was filed under the names of Barbara L. Fox, Lester L. Waters, Jeffrey F. Spelman, Robert B. Seidensticker, and Matthew W. Thomlinson and is assigned to Microsoft Corporation. This application is incorporated herein by reference.

At step 318 in FIG. 11, the key manager 222 executing on headend server 210 provides a program key for the ordered video content program. This program key can be created at the point of order, or previously generated and stored in program keys database 212. The headend server 210 encrypts the program key with the public exchange key of the IC card 50 (step 320). The encrypted program key 246 is sent back over the network 206 to the STB 230 and IC card 50 (step 322). The IC card 50 decrypts the program key using its private exchange key (step 324) and stores the program key in the card memory (step 326).

The headend server 210 then retrieves the ordered program from the video program storage 214 and configures the digital data stream into individual packets. The video encryption device 220 executing on the headend server 210 generates packet keys for each associated video data packet (step 328 in FIG. 12). The video encryption device 220 then encrypts the video data packets according to a function of the associated packet key and the program key (step 330). This encryption process is described above with reference to FIGS. 3–5.

The headend server 210 attaches a security header and a network routing header to each video packet payload and transmits the entire package over the network 206 to the STB 230 (step 332). The security header contains the packet keys. The STB 230 forwards the packet keys to IC card 50 which computes expanded keys for each packet according to a function of each packet key and program key (step 334). The expanded key is output to the STB 230 which uses it to decrypt the video data packets (step 336). The decryption process is also described above in greater detail with reference to FIGS. 3 and 5.

The STB 230 reconstructs the video content program from the video packets (step 338) and outputs the video stream to the television 232 for display (step 340).

The system and method for the secure purchase and delivery of video content programs described herein has several advantages. First, it protects against unauthorized interception of a video data stream in route between a video content provider and a viewer and against unauthorized copying of output data once at the viewer's premises. Second, by equipping the IC card with the critical cryptographic functions, the architecture is versatile to support many different distribution media, including interactive cable networks and digital video disks. Third, the IC cards are easily replaceable, and the keys quickly revocable, which permits easy replacement of the security protocol. Fourth, the system is designed with no global secrets built into any hardware. This eliminates the risk of a pirate cracking a specific hardware component (e.g., the STB) and compromising the entire system. Fifth, the system is convenient for consumers to use.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

We claim:

1. A video content delivery system comprising:
    a video content provider;
    a viewer computing unit located remotely from the video content provider;
    a distribution medium;
    a video encryption device at the video content provider to supply a video data stream in encrypted format on the distribution medium, the video encryption device encrypting the video data stream using a cryptographic program key; and
    an integrated circuit card compatibly couplable to, and interactive with, the viewer computing unit, the integrated circuit card having a memory to store an encrypted cryptographic program key, the integrated circuit card being configured to decrypt the encrypted cryptographic program key with decryption capabilities that are unique to the integrated circuit card, and to at least partly decrypt the video data stream on the distribution medium using the cryptographic program key.

2. A video content delivery system as recited in claim 1 wherein the distribution medium comprises a distribution network interconnecting the video content provider and the viewer purchasing unit.

3. A video content delivery system as recited in claim 2 wherein:
    the video content provider encrypts the cryptographic program key using a public key of an asymmetric key pair that is assigned to the integrated circuit card and downloads the encrypted program key over the distribution network to the integrated circuit card; and
    the integrated circuit card being configured to decrypt the program key using a private key of the asymmetric key pair and to store the decrypted program key in the memory.

4. A video content delivery system as recited in claim 2 wherein the video encryption device comprises a video server which encrypts the video data stream and transmits the encrypted video data stream over the distribution network.

5. A video content delivery system as recited in claim 1 wherein the distribution medium comprises a digital video disk.

6. A video content delivery system as recited in claim 1 wherein the video encryption device configures the video data stream in individual packets of digital video data and encrypts each packet according to a function of a cryptographic packet key associated with each packet and the cryptographic program key.

7. A video content delivery system as recited in claim 6 wherein the encrypted packet keys are transmitted along with their associated packets over the distribution network to the computing unit, the integrated circuit card being configured to at least partly decrypt each packet according to the function of the cryptographic program key and the associated cryptographic packet key.

8. A video content delivery system as recited in claim 1 wherein the cryptographic program key is initially provided on the distribution medium to the integrated circuit card.

9. An interactive entertainment network system comprising:
    a video content provider;
    a video storage medium located at the video content provider to store video content programs;
    multiple user interface units located at subscribers to the interactive entertainment network system, each user interface unit being operable in a video-on-demand mode to enable a user to select a video content program from the video content provider;
    an interactive distribution network interconnecting the video content provider and the user interface units;
    a video server located at the video content provider to supply the video content programs to the user interface units over the interactive distribution network in individual video data packets containing digital video data;
    multiple integrated circuit cards assigned to associated subscribers, each integrated circuit card being compatibly couplable to, and interactive with, one of the user interface units to form a video decryption device each of which has unique video decryption capabilities so that when the user selects a video content program, the video content provider transmits a cryptographic program key associated with the video content program selected by the user over the interactive distribution network to the video decryption device;
    the video server at the video content provider being configured to encrypt the video data packets for the video content program selected by the user using the cryptographic program key; and
    the video decryption device being configured to decrypt the video data packets using the cryptographic program key.

10. An interactive entertainment network system as recited in claim 9 wherein the program key is a symmetric cryptographic key and the video content provider encrypts the program key using a public key of an asymmetric key pair that is assigned to the integrated circuit card.

11. An interactive entertainment network system as recited in claim 9 wherein the video server generates a cryptographic packet key for each video data packet and encrypts the video data packet according to a function of the packet key and the program key.

12. An interactive entertainment network system as recited in claim 11 wherein the integrated circuit card is configured to at least partly decrypt each packet using the program key and the packet key.

13. An interactive entertainment network system as recited in claim 9 wherein the video server generates a cryptographic packet key for each video data packet, expands the packet key according to a first cryptography function involving the packet key and the program key to form an expanded key, and computes an encrypted data set from the digital video data using the expanded key according to a second cryptography function, the video data packet containing the encrypted data set.

14. An interactive entertainment network system as recited in claim 13 wherein:
    the integrated circuit card is configured to expand the packet key according to the first cryptographic function involving the packet key and the program key to reproduce the expanded key; and the user interface unit is configured to decrypt the encrypted data set in each video data packet using the expanded key according to the second cryptography function to reproduce the digital video data.

15. An interactive entertainment network system as recited in claim 9 wherein the user interface unit has a decryption unit that forms in combination with the integrated circuit card the video decryption device, the decryption unit storing a unit identification which is transmitted to the video content provider for the video content provider to verify whether the decryption unit of the user interface unit is authorized for use in the interactive entertainment network system.

16. An interactive entertainment network system as recited in claim 9 wherein each user interface unit has an input device that enables the user to input a personal identification number (PIN) which is used by the integrated circuit card to verify authenticity of the user.

17. A system for purchasing video content programs comprising:

a merchant computing unit at a video merchant;

a portable purchaser integrated circuit (IC) card which compatibly interfaces with the merchant computing unit; and the merchant computing unit being configured to send decryption capabilities unique to both a selected video content program and to the purchaser IC card for use in decrypting the selected video content program.

18. A system as recited in claim 17 wherein the purchaser IC card is locally connected to the merchant computing unit at the video merchant.

19. A system as recited in claim 17 wherein the purchaser IC card is remotely interconnected to the merchant computing unit via a distribution network.

20. A system as recited in claim 17 wherein:

the purchaser IC card has a memory to store a credential containing a cryptographic exchange key, the credential being sent to the merchant computing unit; and the merchant computing unit is configured to encrypt the decryption capabilities using the cryptographic exchange key.

21. A system as recited in claim 17 wherein the purchaser IC card is configured to digitally sign an order for the selected video content program and the merchant computing unit authenticates the digitally signed order from the purchaser IC card to verify the purchaser IC card.

22. A system as recited in claim 17 wherein the merchant computing unit digitally signs the decryption capabilities and the purchaser IC card authenticates the digitally signed decryption capabilities to verify the video merchant.

23. An electronic entertainment system for purchasing video content programs comprising:

a merchant computing unit at a video merchant;

a purchaser computing unit located remotely from the video merchant;

a distribution network interconnecting the merchant computing unit and the purchaser computing unit;

a purchaser integrated circuit (IC) card compatibly couplable to, and interactive with, the purchaser computing unit, the purchaser IC card having a memory to store a credential containing a cryptographic exchange key;

a video purchasing application executing on the purchaser computing unit to permit the purchaser to order a video content program from the video merchant, whereupon ordering a selected video content program, the purchaser IC card digitally signs an order to purchase the selected video content program to the video merchant along with the credential;

the merchant computing unit being configured to authenticate the digitally signed order from the purchaser IC card to verify the purchaser IC card and to send a cryptographic program key unique to the selected video content program to the purchaser IC card for use in decrypting the selected video content program which will be transmitted over the distribution network in an encrypted format, the merchant computing unit further being configured to encrypt the cryptographic program key using the cryptographic exchange key of the purchaser.

24. An electronic entertainment system as recited in claim 23 wherein the merchant computing unit debits an account of the purchaser in response to the digitally signed order to reflect payment of the purchase of the selected video content program.

25. An electronic entertainment system as recited in claim 23 wherein the purchaser computing unit has an input device that enables the purchaser to input a personal identification number (PIN) which is used by the purchaser IC card to verify authenticity of the purchaser.

26. An electronic entertainment system as recited in claim 23 wherein the merchant computing unit adds a digital signature to the program key and the purchaser IC card decrypts the program key using the exchange key and authenticates the digital signature to authenticate that the program key came from the video merchant.

27. An integrated circuit card for use in decryption of video content programs, the video content programs being supplied in encrypted format to a computing unit for display, the integrated circuit card being compatibly couplable to the computing unit, the integrated circuit card comprising:

a processor;

a memory to store an encrypted cryptographic program key; and a video decryption program executing on the processor to decrypt the encrypted cryptographic program key using decryption capabilities that are unique to the integrated circuit card, and to at least partly decrypt a video content program using the cryptographic program key when the integrated circuit card is coupled to the computing unit.

28. An integrated circuit card as recited in claim 27 wherein the video content programs are supplied in individual packets of digital video data, each packet being encrypted using a packet key that is unique for each packet and the cryptographic program key, the video decryption program directing the processor to decrypt each packet using the cryptographic program key stored in the memory and the packet key supplied along with the packet.

29. An integrated circuit card as recited in claim 27 wherein:

the memory stores a pair of public and private exchange keys that are unique to the integrated circuit card;

the cryptographic program key is initially supplied to the integrated circuit card in an encrypted format using the public exchange key; and the integrated circuit card further comprising a key decryption program executing on the processor to decrypt the program key using the private exchange key.

30. A video decryption device comprising:
- a computing unit configured to receive an encrypted video data stream and to output the video data stream in a decrypted format for display on a visual display; and
- an integrated circuit card compatibly couplable to the computing unit, the integrated circuit card comprising a memory to store an encrypted cryptographic program key and a processor programmed to decrypt the encrypted cryptographic program key using decryption capabilities that are unique to the integrated circuit card, and to at least partly decrypt the video data stream using the cryptographic program key when the integrated circuit card is coupled to the computing unit.

31. A video decryption device as recited in claim 30 wherein:
- the video data stream comprises individual packets of digital video data, each packet being encrypted using an associated packet key that is unique for that packet and the cryptographic program key;
- the processor of the integrated circuit card being programmed to generate a decryption tool from each associated packet key and the cryptographic program key stored in the memory; and
- the computing unit being configured to decrypt each packet using the decryption tool.

32. A video decryption device as recited in claim 30 wherein:
- the memory of the integrated circuit card stores a pair of public and private exchange keys;
- the cryptographic program key is supplied to the integrated circuit card in an encrypted format using the public exchange key; and
- the processor of the integrated circuit card is further programmed to decrypt the program key using the private exchange key.

33. A video decryption device as recited in claim 30 further comprising a decryption unit interconnected between the integrated circuit card and the computing unit, the decryption unit storing a unit identification used to verify authenticity of the decryption unit.

34. A method for delivering video content programs, the method comprising the following steps:
- encrypting a cryptographic program key;
- storing the encrypted cryptographic program key on a portable integrated circuit card that is associated with a viewer;
- coupling the integrated circuit card to a computing unit;
- forming a video data stream of the video content program;
- encrypting the video data stream using the cryptographic program key to yield an encrypted video data stream;
- distributing the encrypted video data stream via a distribution medium to the computing unit;
- decrypting the encrypted cryptographic program key with decryption capabilities that are unique to the integrated circuit card; and
- decrypting the encrypted video data stream using the decrypted cryptographic program key stored on the integrated circuit card.

35. A method as recited in claim 34 further comprising the following additional steps:
- forming the video data stream into individual packets of digital video data; and
- encrypting each packet according to a function of both an associated cryptographic packet key and the cryptographic program key.

36. A method as recited in claim 35 further comprising the following additional steps:
- distributing both the packets and associated packet keys via the distribution medium; and
- decrypting each packet using both the associated packet key and the cryptographic program key.

37. A method as recited in claim 34 wherein the supplying step comprises the following steps:
- encrypting the cryptographic program key using a public exchange key of an asymmetric key pair of the integrated circuit card;
- supplying the program key in encrypted format to the integrated circuit card; and
- decrypting the program key using a private exchange key of the asymmetric key pair.

38. A method as recited in claim 34 wherein the supplying step comprises the following steps:
- segmenting the video data stream into individual segments of digital video data;
- said encrypting step comprises for each said segment the following steps:
  - generating a cryptographic packet key;
  - expanding the packet key according to a first cryptography function involving the packet key and the program key to form an expanded key;
  - producing an encrypted data set from the segment of digital video data using the expanded key according to a second cryptography function; and
  - framing the encrypted data set within a packet.

39. A method as recited in claim 38 further comprising the following additional steps:
- distributing both the packets and associated packet keys via the distribution medium;
- expanding the packet key according to the first cryptographic function involving the packet key and the program key to reproduce the expanded key; and
- decrypting the encrypted data set in each packet using the expanded key according to the second cryptography function to reproduce the digital video data.

40. A method as recited in claim 34 wherein the distributing step comprises transmitting the encrypted video data stream over a distribution network to the computing unit.

41. A method as recited in claim 34 wherein the distributing step comprises distributing the encrypted video data stream on digital video disks network to the computing unit.

42. A method for decrypting a video data stream that is transmitted in encrypted format, the video data stream being formatted in individual packets of digital data where each packet is encrypted based upon a function of a cryptographic program key that is associated with the video data stream and a cryptographic packet key that is associated with each respective packet, the method comprising the following steps:
- storing the cryptographic program key on an integrated circuit card;
- compatibly coupling the integrated circuit card to a computing unit; and
- decrypting each packet at the computing unit using a function of the program key and the packet key to reproduce the video data stream.

43. A method for purchasing video content programs from a video merchant, the method comprising the following steps:
- storing a pair of public and private cryptographic exchange keys and a pair of public and private cryptographic signing keys that are unique to the purchaser on an integrated circuit card;

generating an order to purchase a video content program from the video merchant;

digitally signing the order to purchase the video content program using the private signing key;

sending the order and a credential of the purchaser to the video merchant, the credential including the public exchange key and the public signing key;

authenticating the digitally signed order at the video merchant using the public signing key of the purchaser to verify the purchaser;

encrypting a cryptographic program key unique to the video content program ordered by the purchaser using the public exchange key of the purchaser;

sending the encrypted program key to the integrated circuit card;

decrypting the program key at the integrated circuit card using the private exchange key; and storing the program key on the integrated circuit card.

44. A method as recited in claim 43 further comprising the step of debiting an account of the purchaser in response to the order to reflect payment of the purchase of the video content program.

45. A method as recited in claim 43 further comprising the following additional steps:

inputting a personal identification number (PIN) of the purchaser; and verifying the authenticity of the purchaser at the integrated circuit card.

46. A method as recited in claim 43 further comprising the step of digitally signing the program key with a signature of the video merchant.

47. A method for secure purchase and delivery of video content programs, the method comprising the following steps:

storing a cryptographic program key for a video content program at a first location;

generating an order from a purchaser to purchase the video content program;

sending the order to a video merchant;

transferring the cryptographic program key to the purchaser;

storing the cryptographic program key at a second location;

encrypting the video data stream using the cryptographic program key to yield an encrypted video data stream;

distributing the encrypted video data stream via a distribution medium to the purchaser; and decrypting the encrypted video data stream at the purchaser using first and second expansion cryptographic functions, the first of which includes, and is a function of the cryptographic program key and at least one other key which is unique to the video data stream being decrypted.

48. A method as recited in claim 47 further comprising the following additional step of digitally signing the order to purchase the video content program with a digital signature of the purchaser.

49. A method as recited in claim 47 further comprising the following additional step of encrypting the program key with a public key exchange key of an asymmetric key pair that is unique to the purchaser.

50. A method as recited in claim 47 further comprising the following additional steps:

formatting the video data stream into individual packets of digital video data; and encrypting each packet according to a function of an associated cryptographic packet key and the cryptographic program key.

51. A method as recited in claim 50 further comprising the following additional steps:

distributing both the packets and associated packet keys via the distribution medium; and decrypting each packet using both the associated packet key and the cryptographic program key.

52. A method as recited in claim 47 wherein the distributing step comprises transmitting the encrypted video data stream over a distribution network to a computing unit.

53. A method as recited in claim 47 wherein the distributing step comprises distributing the encrypted video data stream on digital video disks network to the computing unit.

54. A method for secure delivery of video content programs comprising:

decrypting a first amount of an encrypted video data stream using a first cryptographic expansion function to yield an expanded first amount of data;

decrypting a second amount of the encrypted video data stream using a second cryptographic expansion function to yield a second amount of data; and combining the second amount of data with remaining encrypted data of the encrypted video data stream to produce a decrypted video data stream.

55. The method as recited in claim 54, wherein the first cryptographic expansion function is a function of two keys, and further comprising destroying one of the keys after using the first cryptographic expansion function.

56. The method as recited in claim 54, wherein the decrypting the first amount comprises decrypting the first amount of the encrypted video data stream using a portable integrated circuit card.

57. The method as recited in claim 54, wherein the decrypting the second amount comprises decrypting the second amount of the encrypted video data stream using a processor for a viewer computing unit, and the decrypting the first amount comprises decrypting the first amount of the encrypted video data stream using an integrated circuit card which is removably operably couplable with the processor.

58. The method as recited in claim 57, wherein the first cryptographic expansion function is a function of two keys, and further comprising destroying one of the keys after using the first cryptographic function so that one of the keys never leaves the integrated circuit card.

59. A method of delivering video content programs comprising:

segmenting a video data stream into individual segments of digital video data;

generating a cryptographic packet key for each segment;

expanding each packet key according to a first cryptography function involving the packet key and a cryptographic program key to form an expanded key;

producing an encrypted data set from each segment of digital video data using the associated expanded key according to a second cryptographic function;

framing each encrypted data set within a packet;

distributing both the packets and associated packet keys via a distribution medium to a computing unit;

expanding each packet key according to the first cryptographic function involving the associated packet keys and the program key to reproduce the expanded key; and decrypting each encrypted data set in each packet using the associated expanded key according to the second cryptographic function to reproduce the digital video data.

60. The method of claim 59 further comprising destroying each packet key after reproducing the expanded key.

61. The method of claim 59, wherein the expanding of the packet keys to reproduce the expanded keys takes place within a programmed integrated circuit card; and further comprising outputting the reproduced expanded keys to the computing unit, wherein the decrypting of the encrypted data set takes place within the computing unit away from the programmed integrated circuit card.

62. The method of claim 61 further comprising after expanding the packet keys within the programmed integrated circuit card, destroying each packet key so that the computing unit never receives a packet key.

63. A video content delivery system comprising:
   a video content provider;
   a viewer computing unit located remotely from the video content provider;
   a distribution medium; a video encryption device at the video content provider to supply a video data stream in encrypted format on the distribution medium, the video encryption device encrypting the video data stream using a cryptographic program key;
   an integrated circuit card compatibly couplable to, and interactive with, the viewer computing unit, the integrated circuit card having a memory to store the cryptographic program key, the integrated circuit card being configured to at least partly decrypt the video data stream on the distribution medium using the cryptographic program key; and
   wherein the video encryption device configures the video data stream in individual packets of digital video data and encrypts each packet according to a function of a cryptographic packet key associated with each packet and the cryptographic program key.

64. The video content delivery system of claim 63, wherein the encrypted packet keys are transmitted along with their associated packets over the distribution network to the computing unit, the integrated circuit card being configured to at least partly decrypt each packet according to the function of the cryptographic program key and the associated cryptographic packet key.

65. An interactive entertainment network system comprising:
   a video content provider;
   a video storage medium located at the video content provider to store video content programs;
   multiple user interface units located at subscribers to the interactive entertainment network system, each user interface unit being operable in a video-on-demand mode to enable a user to select a video content program from the video content provider;
   an interactive distribution network interconnecting the video content provider and the user interface units;
   a video server located at the video content provider to supply the video content programs to the user interface units over the interactive distribution network in individual video data packets containing digital video data, wherein the video server generates a cryptographic packet key for each video data packet and encrypts the video data packet according to a function of the packet key and the program key;
   multiple integrated circuit cards assigned to associated subscribers, each integrated circuit card being compatibly couplable to, and interactive with, one of the user interface units to form a video decryption device so that when the user selects a video content program, the video content provider transmits a cryptographic program key associated with the video content program selected by the user over the interactive distribution network to the video decryption device;
   the video server at the video content provider being configured to encrypt the video data packets for the video content program selected by the user using the cryptographic program key; and
   the video decryption device being configured to decrypt the video data packets using the cryptographic program key.

66. An interactive entertainment network system as recited in claim 65, wherein the integrated circuit card is configured to at least partly decrypt each packet using the program key and the packet key.

67. An interactive entertainment network system comprising:
   a video content provider;
   a video storage medium located at the video content provider to store video content programs;
   multiple user interface units located at subscribers to the interactive entertainment network system, each user interface unit being operable in a video-on-demand mode to enable a user to select a video content program from the video content provider;
   an interactive distribution network interconnecting the video content provider and the user interface units;
   a video server located at the video content provider to supply the video content programs to the user interface units over the interactive distribution network in individual video data packets containing digital video data, wherein the video server generates a cryptographic packet key for each video data packet, expands the packet key according to a first cryptography function involving the packet key and the program key to form an expanded key, and computes an encrypted data set from the digital video data using the expanded key according to a second cryptography function, the video data packet containing the encrypted data set;
   multiple integrated circuit cards assigned to associated subscribers, each integrated circuit card being compatibly couplable to, and interactive with, one of the user interface units to form a video decryption device so that when the user selects a video content program, the video content provider transmits a cryptographic program key associated with the video content program selected by the user over the interactive distribution network to the video decryption device;
   the video server at the video content provider being configured to encrypt the video data packets for the video content program selected by the user using the cryptographic program key; and
   the video decryption device being configured to decrypt the video data packets using the cryptographic program key.

68. An interactive entertainment network system as recited in claim 67, wherein:
   the integrated circuit card is configured to expand the packet key according to the first cryptographic function involving the packet key and the program key to reproduce the expanded key; and the user interface unit is configured to decrypt the encrypted data set in each video data packet using the expanded key according to the second cryptography function to reproduce the digital video data.

69. An integrated circuit card for use in decryption of video content programs, the video content programs being supplied in encrypted format to a computing unit for display, the integrated circuit card being compatibly couplable to the computing unit, the integrated circuit card comprising:

a processor;

a memory to store a cryptographic program key; and a video decryption program executing on the processor to at least partly decrypt a video content program using the cryptographic program key when the integrated circuit card is coupled to the computing unit, wherein the video content programs are supplied in individual packets of digital video data, each packet being encrypted using a packet key that is unique for each packet and the cryptographic program key, the video decryption program directing the processor to decrypt each packet using the cryptographic program key stored in the memory and the packet key supplied along with the packet.

70. A video decryption device comprising:

a computing unit configured to receive an encrypted video data stream and to output the video data stream in a decrypted format for display on a visual display; and an integrated circuit card compatibly couplable to the computing unit, the integrated circuit card comprising a memory to store a cryptographic program key and a processor programmed to at least partly decrypt the video data stream using the cryptographic program key when the integrated circuit card is coupled to the computing unit, wherein:

the video data stream comprises individual packets of digital video data, each packet being encrypted using an associated packet key that is unique for that packet and the cryptographic program key;

the processor of the integrated circuit card being programmed to generate a decryption tool from each associated packet key and the cryptographic program key stored in the memory; and the computing unit being configured to decrypt each packet using the decryption tool.

71. A method for delivering video content programs, the method comprising the following steps:

supplying a cryptographic program key to a viewer;

storing the cryptographic program key on a portable integrated circuit card that is associated with a viewer;

coupling the integrated circuit card to a computing unit;

forming a video data stream of the video content program into individual packets of digital video data;

encrypting the video data stream using the cryptographic program key to yield an encrypted video data stream, the encrypting comprising encrypting each packet according to a function of both an associated cryptographic packet key and the cryptographic program key;

distributing the encrypted video data stream via a distribution medium to the computing unit; and decrypting the encrypted video data stream using the cryptographic program key stored on the integrated circuit card.

72. A method as recited in claim 71 further comprising the following additional steps:

distributing both the packets and associated packet keys via the distribution medium; and decrypting each packet using both the associated packet key and the cryptographic program key.

73. A method for delivering video content programs, the method comprising the following steps:

supplying a cryptographic program key to a viewer;

storing the cryptographic program key on a portable integrated circuit card that is associated with a viewer;

coupling the integrated circuit card to a computing unit;

forming a video data stream of the video content program;

encrypting the video data stream using the cryptographic program key to yield an encrypted video data stream;

distributing the encrypted video data stream via a distribution medium to the computing unit; and decrypting the encrypted video data stream using the cryptographic program key stored on the integrated circuit card, wherein the supplying step comprises the following steps:
  segmenting the video data stream into individual segments of digital video data;
  said encrypting step comprises for each said segment the following steps:
    generating a cryptographic packet key;
    expanding the packet key according to a first cryptography function involving the packet key and the program key to form an expanded key;
    producing an encrypted data set from the segment of digital video data using the expanded key according to a second cryptography function; and
    framing the encrypted data set within a packet.

74. A method as recited in claim 73 further comprising the following additional steps:

distributing both the packets and associated packet keys via the distribution medium;

expanding the packet key according to the first cryptographic function involving the packet key and the program key to reproduce the expanded key; and decrypting the encrypted data set in each packet using the expanded key according to the second cryptography function to reproduce the digital video data.

* * * * *

US006055314C1

(12) EX PARTE REEXAMINATION CERTIFICATE (8942nd)

United States Patent
Spies et al.

(10) Number: US 6,055,314 C1
(45) Certificate Issued: Apr. 3, 2012

(54) SYSTEM AND METHOD FOR SECURE PURCHASE AND DELIVERY OF VIDEO CONTENT PROGRAMS

(75) Inventors: Terence R. Spies, Kirkland, WA (US); Daniel R. Simon, Redmond, WA (US)

(73) Assignee: Microsoft Corporation, Redmond, WA (US)

Reexamination Request:
No. 90/011,542, Mar. 7, 2011

Reexamination Certificate for:
Patent No.: 6,055,314
Issued: Apr. 25, 2000
Appl. No.: 08/620,603
Filed: Mar. 22, 1996

(51) Int. Cl.
*H04N 7/16* (2006.01)
*H04N 7/167* (2006.01)
*G07F 7/10* (2006.01)
*G07F 17/00* (2006.01)
*G07F 17/16* (2006.01)

(52) U.S. Cl. .................. 380/228; 380/278; 380/239; 705/55; 713/160; 348/E7.061; 348/E7.063; 348/E7.056

(58) Field of Classification Search .................. None
See application file for complete search history.

(56) References Cited

To view the complete listing of prior art documents cited during the proceeding for Reexamination Control Number 90/011,542, please refer to the USPTO's public Patent Application Information Retrieval (PAIR) system under the Display References tab.

*Primary Examiner* — Minh Dieu Nguyen

(57) ABSTRACT

A system and method for secure purchase and delivery of video content programs over various distribution media, including distribution networks and digital video disks, includes an integrated circuit card (e.g., a smart card, PCMCIA card) which is configured to store decryption capabilities for related video programs. The decryption capabilities are initially kept in a secure store at a video merchant. When a purchaser orders a particular video program, the decryption capabilities for that program are downloaded to the IC card, either at the merchant premises or over a distribution network. The video content program is distributed in encrypted format via the distribution media to the purchaser. The IC card uses the decryption capabilities to at least partly decrypt the video content program without exposing the decryption capabilities.

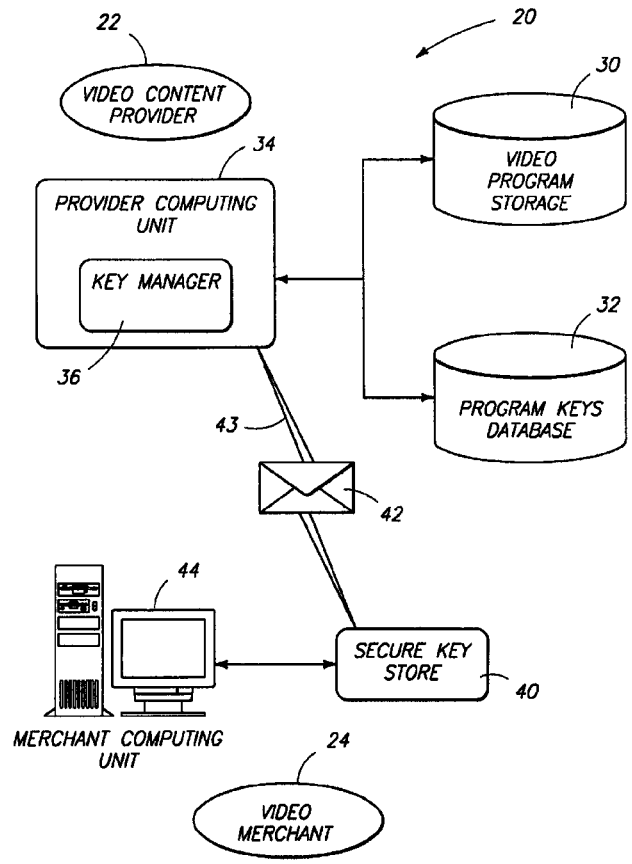

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4, 6-8, 27, 29-32, 42, 63-64 and 70 is confirmed.

Claims 5, 9-26, 28, 33-41, 43-62, 65-69 and 71-74 were not reexamined.

\* \* \* \* \*